United States Patent [19]

Obermarck et al.

[11] Patent Number: 4,847,754
[45] Date of Patent: Jul. 11, 1989

[54] EXTENDED ATOMIC OPERATIONS

[75] Inventors: Ronald L. Obermarck, Redwood City; John D. Palmer; Richard K. Treiber, both of San Jose, all of Calif.

[73] Assignee: International Business Machines Corporation, Armonk, N.Y.

[21] Appl. No.: 787,221

[22] Filed: Oct. 15, 1985

[51] Int. Cl.[4] ............................................. G06F 9/46
[52] U.S. Cl. .................................................. 364/200
[58] Field of Search ... 364/200 MS File, 900 MS File, 364/300

[56] References Cited

U.S. PATENT DOCUMENTS

| | | | |
|---|---|---|---|
| 3,564,504 | 2/1971 | Morenoff et al. | 364/200 |
| 4,183,083 | 1/1980 | Chatfield | 364/200 |
| 4,189,771 | 2/1980 | Roever | 364/300 |
| 4,249,241 | 2/1981 | Aberle et al. | 364/200 |
| 4,318,182 | 3/1982 | Bachman et al. | 364/200 |
| 4,348,725 | 9/1982 | Farrell et al. | 364/300 |
| 4,399,504 | 8/1983 | Obermarck et al. | 364/200 |
| 4,410,940 | 10/1983 | Carlson et al. | 364/200 |
| 4,432,057 | 2/1984 | Daniell et al. | 364/300 |
| 4,482,956 | 11/1984 | Tallman | 364/200 |
| 4,498,145 | 2/1985 | Baker et al. | 364/900 |

FOREIGN PATENT DOCUMENTS 0063186 3/1981 European Pat. Off. .
0145889 10/1984 European Pat. Off. .

OTHER PUBLICATIONS

Siegel, J. J., "Compare Double and Swap Extended Instruction", IBM TDB, vol. 18, No. 12, May 1976, p. 4110.
McKinstry, R. H., "Serialization of Dependent Processes", IBM TDB, vol. 16, No. 6, Nov. 1973, p. 1849.
Meritt et al., "Storage Pool Management Across Multiple Processors", IBM TDB, vol. 23, No. 4, Sep. 1980, pp. 1564-1567.
Collier et al., "Spin Queues", IBM TDB, vol. 18, No. 6, Nov. 1975, pp. 1953-1954.
Taradalsky, M., "First In/First Out Queuing Technique Using Compare and Swap", IBM TDB, vol. 18, No. 5, Oct. 1975, pp. 1547-1548.
Kinkade, Jr., "Compare and Swap Implementation of Task Logic", IBM TDB, vol. 16, No. 2, Jul. 1973, pp. 474-476.
Gum et al., "Locking Architecture in a Multiple Virtual Memory Multiprocessing System", IBM TDB, vol. 16, No. 7, Dec. 1973, pp. 2420-2422.
European Search Report, Aug. 4, 1987, Applicaton No. EP 84 11 2626.
Partial European Search Report, Dec. 17, 1981, Application No. EP 81 30 1081.
European Patent Office Communication, Aug. 16, 1988, Application No. 86111147.4.
Hwang, Kai et al, Computer Architecture and Parallel Processing, (McGraw-Hill Book Company), 1984, pp. 565-572.
Deitel, Harvey M., An Introduction to Operating Systems (Addison-Wesley Pub. Co.), 1984, pp. 77-100.
"Networking Software," by Jonathan L. Yarmis, Computerworld Focus, May 8, 1985, pp. 10-13.
"Going With A Standard; But Which One?", by Tony Bolton, Computerworld, Mar. 25, 1985, pp. 15-20.
"IBM's Token Ring: Have The Pieces Finally Come Together?", by Jean Bartik, Data Communications, Aug. 1984, pp. 21-32.
"New Standards For Local Networks Push Upper Limits For Lightwave Data," by Sunil Joshi and Venkatraman Iver, Data Communications, Jul. 1984, pp. 33-41.

Primary Examiner—Gareth D. Shaw
Assistant Examiner—Jonathan C. Fairbanks
Attorney, Agent, or Firm—Baker, Maxham, Jester & Meador

[57] ABSTRACT

A method for serializing process access to shared resources utilizing low-level atomic functions to maintain control structures in which noncontiguous words must be modified at two different times. The atomic functions require an initiation operation partitionable from a completion operation. Each process requesting access to the shared resource performs the initiation operation, which begins modification of a control structure. The completion operation may be performed by the original process if there is no resource conflict. If, however, another process is currently modifying the control structure, then the task of performing the completion operation is passed to one of the concurrently-accessing processes.

19 Claims, 6 Drawing Sheets

4,847,754

EXTENDED ATOMIC OPERATIONS

BACKGROUND OF THE INVENTION

This invention relates to the serializations of access to shared resources among concurrent processes in a multiprocess, multiprogramming CPU environment, and more particularly, to serialization by use of low-level atomic functions requiring an access initiation operation partitionable from an access completion operation.

As is known, a central electronic complex (CEC) can include one or more CPU's that utilize a main storage facility, input/output facilities and services, and communications facilities for communicating with, for example, another CEC.

In a CEC, or in a CPU of a CEC, concurrently-operating processes can compete for access to shared resources such as memory, I/O, a CPU, data lists, or communications services, which are necessary to assist a process in its operation.

When used herein, the term process refers to a sequence of operations that result in an identifiable outcome. A number of processes can operate concurrently in a CEC in either a multiprocessing or a multiprogramming environment.

Customarily, an operating system is provided in a CEC, which consists of software that controls execution of programs. An operating system is typically enabled to schedule events, control the execution of processes and schedule their access to resources. In this regard, an operating system facilitates orderly access to resources by implementing sequencing mechanisms that serialize the access of competing processes to shared resources.

As described in Hwang and Briggs, "Computer Architecture and Parallel Processing," 1984, one method of resource use serialization of competing processes involves a synchronization mechanism that utilizes a shared variable whose condition indicates the status of a shared resource. Access of a process to the resource is signalled by the variable being placed by the process into a "busy" condition, which indicates unavailability of the resource to other processes requiring use of it. When a process observes that the shared variable has an "available" or "unbusy" condition, it will be able to obtain the resource for its own use.

Mutual exclusion of access to shared resources, according to Hwang and Briggs, can be implemented by a sequence of instructions forming a part of an operating system that define "lock" and "unlock" operations. For the lock operation, a process executes against a resource status variable (RSV) by inspecting its current condition and, when the condition is other than busy (unlocked), setting the RSV to busy (locking it), and then using the resource. Then, when use of the resource is completed, the process executes against the RSV in an unlock operation wherein the RSV is set to a nonbusy condition. Under this construct, a process has exclusive control over the resource once it "locks" the lock; other processes cannot gain entree until the controlling process "unlocks" the lock.

To preclude the ambiguous circumstance where one process detects a nonbusy condition before a competing process sets the RSV to "busy," the IBM System 370 extended architecture (as described in IBM Publication No. SA 22-7085-0) provides a family of atomic operations that test and modify an RSV held at a storage location in a single read-modify-write instruction cycle. The atomic operations are completed in one cycle so that the RSV is not tested and set by another process before the currently-executing process completes its operation. Thus, the operations are "atomic" in the sense that they either succeed completely in altering the condition of the RSV or fail, in which case the RSV is left unchanged.

Obermarck U.S. Pat. No. 4,399,504 teaches lock management to control access to data resources shared by two or more central electronic complexes. Obermarck is instructive in one of the principal limitations of presently-utilized lock operations: the requirement that waiting processes suspend operations when contending for shared resources.

Methods other than lock setting are also available to serialize access to shared resources. Roever U.S. Pat. No. 4,189,771 describes a single thread, contention-free process for detecting deadlock from a vector of process wait relations. Carlson et al. U.S. Pat. No. 4,410,940 provides for transfer of control among hierarchically related processes through the use of pointers to traverse an activity. Chatfield U.S. Pat. No. 4,183,083 utilizes a form of dynamic scheduling to increase throughput in a multiprogrammed computing system.

Processor synchronization, implemented by interprocess communication, is also used to serialize utilization of shared resources. Interprocess communication involves passing data across message interfaces between processes. This is typically referred to as "loose coupling." Loose coupling by processor intercommunication places reliance on pattern and content of message traffic. Moreover, it is often the case that communicating processors may share only a few physical resources such as the network or secondary storage. Securing mutual exclusion of resource access while avoiding mutual blocking or suspension has led to embedding language/algorithmic constructs within the competing processes or embedding such constructs in the form of monitors in operating systems. A well-known software solution in this regard has been contributed by Dijkstra in "Cooperating Sequential Processes," PROGRAMMING LANGUAGES, Academic Press, 1968. However, such constructs are too slow to provide nanosecond access in tightly-coupled environments where, for example, two processes compete for main store.

SUMMARY OF THE INVENTION

It is therefore the primary objective of the present invention to provide a lock-free method for serializing access among concurrent, competing processes to shared resources. It is a related object to provide such a method through the extended use of low-level atomic instructions. It is a yet further object that the use of such low-level instructions be used to serialize access through the maintenance of control structures including noncontiguous words modifiable at different times.

The above objects are satisfied by a lock-free method that serializes access to shared resources among concurrent, competing processes in either a multiprogramming pre-emptive scheduling environment or where at least two processors share a common main store. In the method, process access to resources includes the indivisible (atomic) operation having the steps of reading a resource status variable, storing its value in a save area, and, conditioned upon the value of the variable, altering the variable. The method includes the steps of storing each resource status variable in a main store that is accessible to the concurrent, competing processes. Following storage, the method has the further indivisible steps of partially executing against a resource status variable by one process while checking for resource contention from another process, and, in the event of resource contention between processes, passing an obligation to complete the execution against the resource status variable to one of the contending processes.

In this invention, certain control structures, referred to as resource status variables (RSV's) include noncontiguous words that must be modified at two different times. The access function implemented by the method requires an initiation operation partitionable from (performed at a different time than) a completion operation, and does not require performance of both operations by the same process. In this regard, each process petitioning for access to a shared resource performs an initiation operation by executing against an RSV associated with the shared resource, which begins the modification of the RSV and makes the resource available to the requesting process. The completion operation may be performed by the original process if there is no resource conflict. If, however, another process is concurrently using the resource involved, then the task of performing the completion operation is allocated to one of the competing processes. This is termed "obligation passing."

The generic invention is further embodied in the control of resource use by processes in a communications environment while preserving a sequence of original requests from message sending processes, and in providing simultaneous access to linked lists without requiring exclusive control locks by competing processes.

DESCRIPTION OF THE PREFERRED EMBODIMENTS

This invention is concerned with the provision of access to shared resources among concurrently-executing processes that compete for the resources.

This invention may be advantageously practiced on a computing system of the IBM/370 type in which a sequence of machine instructions implementing the method form part of an operating or database system. In the subsequent discussion, the steps of the invention and its use and relevant portions of a communications service and a global queue management service will be described.

The invention is intended to be utilized in an operating system environment that contains conventional data management facilities, manages auxiliary storage, and provides typical program language compiler and assembly capabilities. Assembly level language for a system such as the IBM System/370 is well known and understood. In this regard, the method steps are expressed in source assembly level language statements to be found in Tables I-X.

Figure 1:
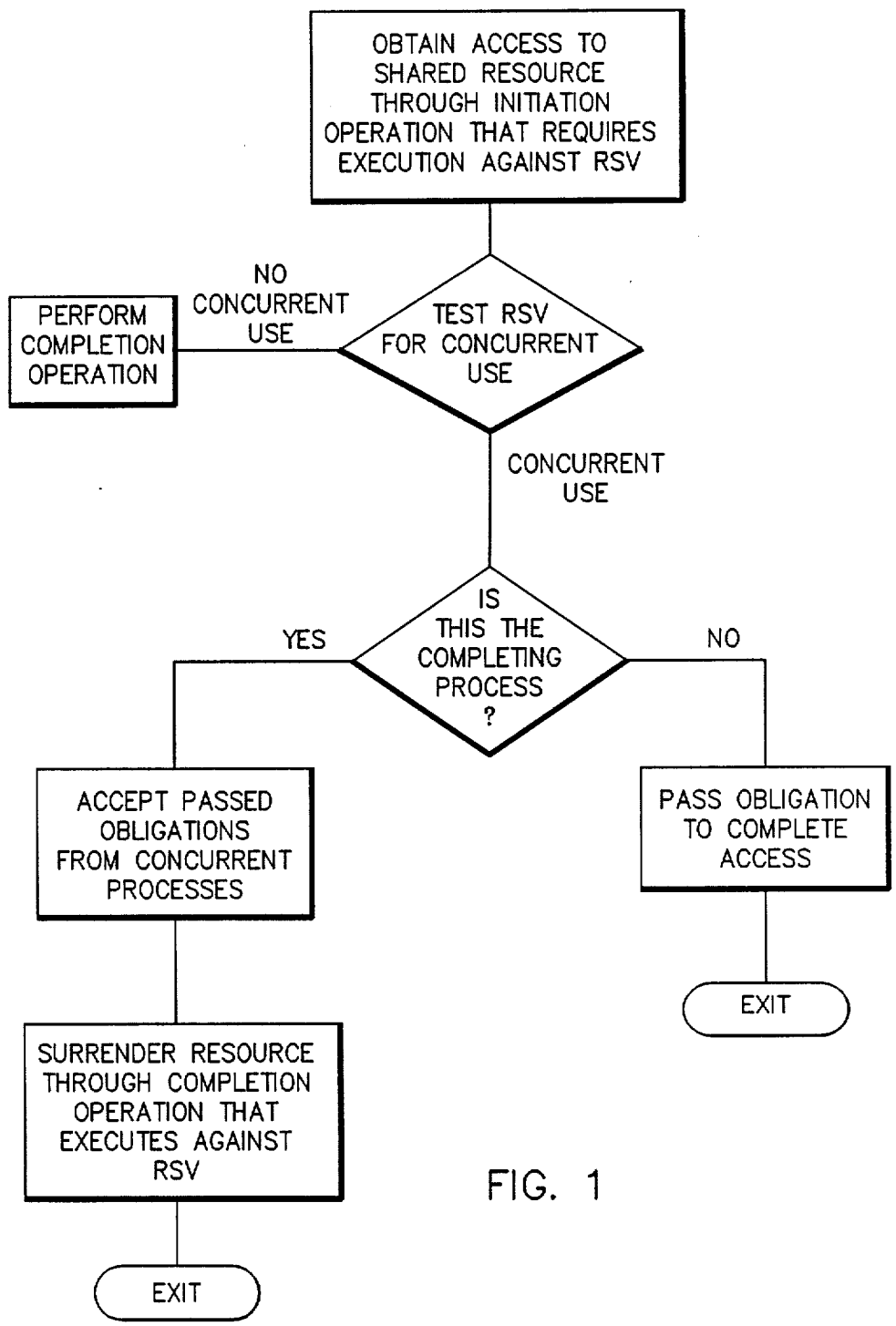
FIG. 1 depicts a flow diagram that summarizes the lock-free method of the invention.

Refer to FIG. 1 for an understanding of the generic invention. Assuming a multiprogramming or multiprocessing environment where a plurality of processes require use of a single resource while executing independently, the problem of providing access to the resource is solved by serializing such access. The method of the invention provides such serialization without delaying a process while another process uses the resource. In this respect, a process is granted access to and use of a resource after performing an initiation operation involving one or more atomic operations that executes against a control structure. The control structure has words forming a variable that indicate the current status of the resource with regard to its use by other processes. The structure is referred to hereinafter as a resource status variable (RSV).

After gaining use of the resource through the initiation operation, a process tests the RSV to determine whether another process has gained concurrent use of the resource. Again, testing of the RSV is by way of atomic operations. If there is no concurrent use by the time the process completes its use of the resource, the process uses an atomic operation to perform a completion operation that executes against the RSV.

When concurrent use of the resource is detected, the obligation to complete execution against the RSV and place it in a non-busy condition is passed to one of the concurrent processes. In this regard, one of the competing processes is determined to be the completing process. Any process using the resource concurrently with the completing process uses an atomic operation to pass an obligation to complete the process to the completing process and then exits the resource. The completing process accepts completion obligations passed to it by concurrently using processes. When the completing process finishes its use of the resource, it relinquishes the resource by performing a completion operation that executes against the RSV, and places the RSV in a non-busy condition. Performance of the completion operation in this instance is, once more, by way of an atomic operation.

FIRST EMBODIMENT: COMMUNICATIONS RESOURCE CONSUMPTION CONTROL

Figure 2:
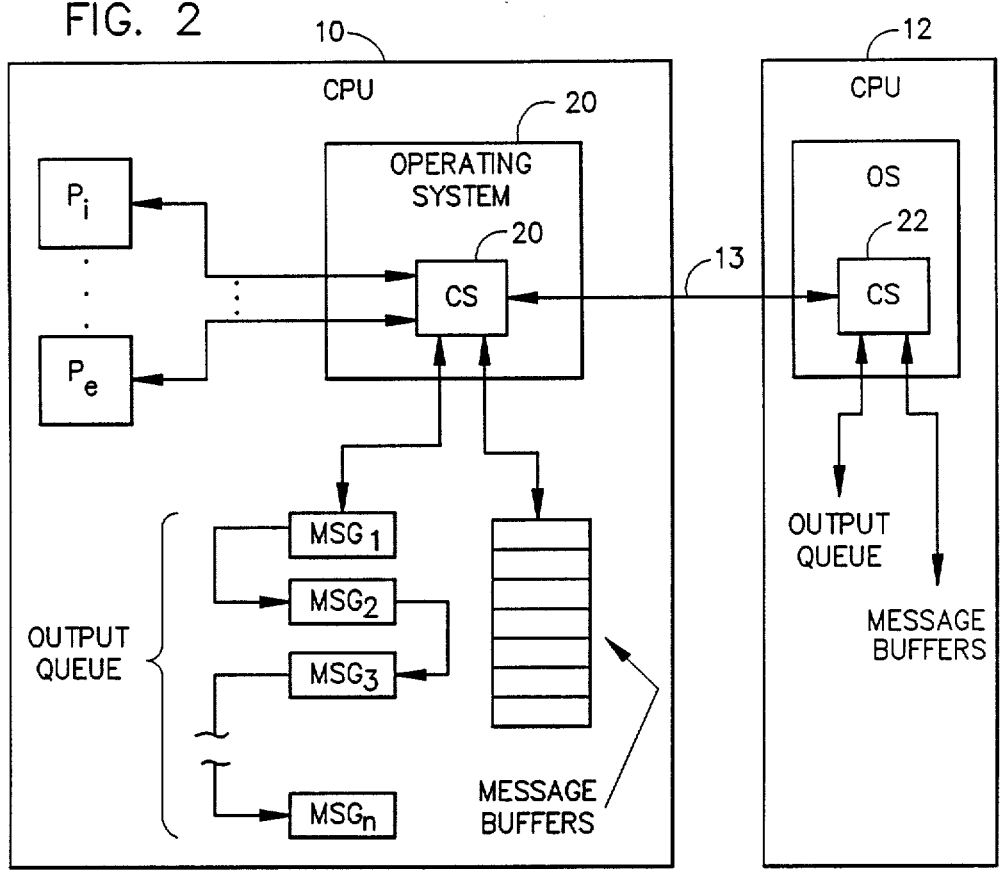
FIG. 2 illustrates a first embodiment of the method of the invention used in a multiprogramming environment to schedule the access of concurrent processes to a communication channel.

In a first embodiment of the method of the invention, a pair of communicating CPU's, 10 and 12, are shown in Figure 2. Each CPU comprises a general purpose unit together with main and virtual storage apparatuses, and the usual channels and peripheral equipment. A typical CPU is exemplified by the IBM System/360 or IBM System/370, the architecture of which is described in U.S. Pat. No. 3,400,371 by G. M. Amdahl et al. entitled "Data Processing System," or in IBM System/370 Principles of Operation, IBM Publication GA 22-7000-8.

The CPU's of FIG. 2 may reside in the same or separate central electronics complexes; however, each CPU operates under control of an operating system (OS) such as the IBM System/360 and 370 operating systems.

Each of the CPU's 10 and 12 of FIG. 2 has a plurality of independently-executing processes. Provision is made for communications between processes in the respective CPU's 10 and 12 by a communications channel 13 which provides message conductivity between communication services (CS) 20 and 22 in the CPU's 10 and 12. The communication services 20 and 22 may be provided, for example, by communications controllers such as the IBM 3705, or by software services that operate under control of their respective operating systems. Each of the communication services 20 and 22 provides outgoing message service for processes in its respective CPU having data to be sent to processes in the other CPU. Each communication service also receives incoming messages containing data from processes in the other CPU that are destined for delivery to processes in the communication service's CPU.

Each of the communication services 20 and 22 maintains, in its respective main store, an output queue for scheduling outgoing message transfer and a set of message buffers to stage incoming messages to local processes.

As is conventional, communications on the communication channel 13 are paced according to the capacity of a communication service to receive messages. Viewed from another aspect, either of the communication services 20 or 22 sends outgoing messages only under the condition that the other communication service has the message buffer capacity to store the messages. Therefore, the communication services 20 and 22 operate under a conventional interactive protocol whereby outgoing messages contain not only data to be transferred to particular processes in a receiving CPU, but also information indicating the excess message buffer capacity in its own set of message buffers. The excess buffer capacity, called "credit" hereinafter, is used by a communication service to schedule message transfer.

Figure 3:
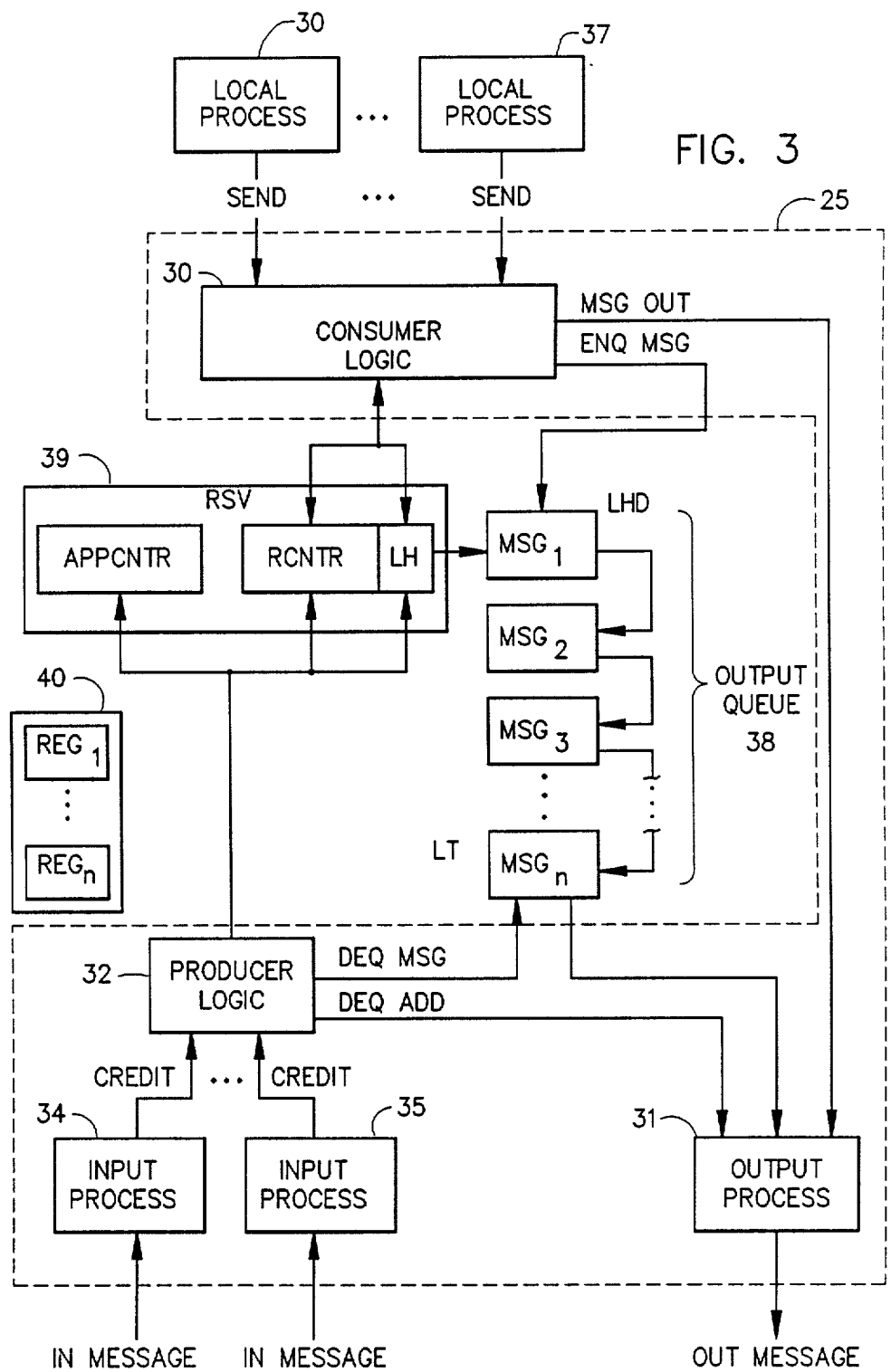
FIG. 3 depicts the interconnection of producer and consumer logic in a communications service connected to the communication channel of FIG. 2.

As shown in FIG. 3, a communication service 25 implementing the first embodiment of the method of the invention includes consumer logic 30, an output message process 31, producer logic 32 and input processes 34–35. The consumer logic 30 enables local processes 36–37 to send messages to processes in another CPU. If there is sufficient credit, a message is forwarded on an output message (MSG OUT) path to the output process 31. The output process 31 formats the message for interprocessor forwarding and implements the control necessary to forward the message according to the particular protocol.

In the event that no credit is available for transmission of a message to the other CPU, the consumer logic 30 enqueues local process messages (ENQ MSG) in an output queue 38. Messages in the output queue 38 ($MSG_1$-$MSG_n$) are transmitted in a preferred order when credit is available for transmission.

Messages received from another communication service (not shown) contain an indication of credit available at the service from which the messages were transmitted. Messages received from the other service (IN MESSAGE) are accepted by one of the input processes 34–35 which forwards the message to the destination process by way of a message buffer which is not shown and also extracts the credit count placed in the message by the transmitting communication service. Credit counts are applied by the input processes 34–35 through the producer logic 32. If there are no messages in the queue 38, credits from the input processes 34–35 are accumulated through the producer logic for future application. If there are queued messages, credit is applied by dequeueing messages (DEQ MSG) from the output queue 38 and providing the address of the dequeued messages (DEQ ADD) to the output process 31. The output process obtains the dequeued messages at their specified addresses and formats and transmits them over the communications channel. If there are no queued messages, the accumulated credit is decremented by the consumer logic 30 by a fixed amount each time a message is forwarded to the output routine 31.

The operations of the consumer logic 30 and producer logic 32 are synchronized by execution against the resource status variable (RSV) 39. The RSV 39, together with the output queue 38, is located, preferably, in a shared main memory available to all processes utilizing the communications service 25.

The RSV 39 includes three elements, an apply counter (APPCNTR), a resource counter (RCNTR) and a list header (LH). The RCNTR and the LH are a pair of contiguous words in the storage area, while the APPCNTR is a third word, not necessarily contiguous with RCNTR and LH.

In this embodiment, a resource, available communication capacity corresponding to available credit, is represented by the RCNTR. If the RCNTR is positive, resource is available for use and messages can be transmitted from the communication service 20. If the RCNTR is zero, no resource is available for use. If the RCNTR is negative, no resource is available for use and the absolute value of the RCNTR represents the number of messages waiting in the output queue for transmission.

The LH is associated with the RCNTR and contains zero or null when no messages are in the output queue. When messages have been placed in the output queue, they are chained from a pointer in LH that points to the last message presented for transmission and made to wait in the queue (the list head LH).

The APPCNTR has a positive value when credit is being applied to service a queue of waiting messages. The APPCNTR holds a value of zero when no credit is being applied to messages waiting in a populated queue.

As is conventional, the CPU wherein the communications service 25 is located includes general purpose registers 40 that are made available by the CPU's operating system to the communication service for conducting the operations of the consumer logic 30 and the producer logic 32.

The procedures executed by the consumer logic 30 and producer logic 32 in practicing the instant embodiment of the method of the invention will next be described in connection with the code representations of Tables I through IV. The code listings of Tables I through IV comprise assembly language instructions drawn from the IBM System/370 Principles of Operation referenced above. As will be apparent to those skilled in the art, the code representations, together with the accompanying description, can be included by skilled artisans in an operating system, in the form of machine-executable instructions, that operate a general purpose computing system according to the instant embodiment.

By way of setting a framework for an understanding of the procedures of Tables I through IV, reference is made to two atomic instructions: COMPARE AND SWAP (CS) and COMPARE DOUBLE AND SWAP (CDS). Both of these instructions are explained in detail in the IBM System/370 Principles of Operation referenced above; further, their application to enforce mutual exclusion of access to shared resources by means of locks is explained in detail in Hwang and Briggs at pages 559-562.

The CS instruction has the following code representation: CS (R0, R2, Si). The CDS command has the form: CDS (R0, R2, Si). For the CS instruction, the first and third operands, occupying general registers R0 and R2, are 32 bits in length. The second operand is a 32-bit word in storage at address $S_i$.

For CDS, the first and third operands each occupy an even/odd pair of general registers and are 64 bits in length. Thus, the first operand, for example, occupies registers R0 and R1, while the third operand occupies registers R2 and R3. The second operand is a double word occupying a pair of contiguous locations in storage, with the doubleword storage location address given by $S_i$.

In both the CS and CDS operations, the first and second operands are compared; if they are equal, the operation succeeds and the third operand is stored at the second-operand location; if they are unequal, the operation fails and the second operand is loaded into the first operand registers.

TABLE I

| DATA AREA DESCRIPTIONS | | | | |
|---|---|---|---|---|
| COMMON | DSECT | | /*DATA AREA SHARED BETWEEN | */ |
| * | | | /*ALL PROCESSES | */ |
| | DS | 0D | /*DOUBLEWORD ALIGN | */ |
| RCNTR | DS | F | /*WORD FOR COUNT OF RESOURCE | */ |
| * | | | /*AVAILABLE | */ |
| LH | DS | A | /*ADDRESS OF LAST CONSUMER | */ |
| * | | | /*QUEUED OR 0, I.E. LISTHEAD | */ |
| MESSAGE | DSECT | | /*MESSAGE CONTAINING PACING | */ |
| * | | | /*CREDIT | */ |
| PRODVALU | DS | F | /*AMOUNT OF CREDIT PROVIDED | */ |
| APPCNTR | DC | F | /*AMOUNT OF CREDIT AVAILABLE | */ |

TABLE II

| CONSUMER LOGIC: | | REGISTER 12 CONTAINS ADDRESS OF CURRENT MESSAGE READY FOR TRANSFER BY COMMUNICATION SERVICE 25 | | |
|---|---|---|---|---|
| 0050 | CONS00 | EQU | * | /*CONSUMER LOGIC */ |
| 0051 | | L | R2,RCNTR | /*GET RCNTR VALUE */ |
| 0052 | | LTR | R4,R2 | /*IS IT GREATER THAN ZERO? */ |
| 0053 | | BNP | CONS40 | /*BRANCH IF RCNTR <= ZERO */ |
| 0054 | | S | R4,=F'1' | /*SUBTRACT ONE */ |
| 0055 | | CS | R2,R4,RCNTR | /*UPDATE RCNTR */ |
| 0056 | | BNE | CONS00 | /*BRANCH IF RCNTR HAD */ |
| * | | | | /*CHANGED */ |
| 0057 | | L | R15,=V(OUTRTNE) | /*OUTPUT ROUTINE */ |
| 0058 | | BALR | R14,R15 | /*ALLOW CONSUMPTION BY */ |
| * | | | | /*R12 CONSUMER */ |
| 0059 | | B | CONSDONE | /*DONE */ |
| 0060 | CONS40 | EQU | * | /*RCNTR <= ZERO, MUST */ |
| * | | | | /*QUEUE UNTIL CREDIT */ |
| * | | | | /*AVAILABLE */ |
| 0061 | | S | R4,=F'1' | /*SUBTRACT ONE */ |
| 0062 | | L | R3,LH | /*GET ADDRESS OR ZERO */ |
| 0063 | | ST | R3,0(,R12) | /*INTO CHAIN FIELD OF */ |
| * | | | | /*CONSUMER PROCESS */ |
| 0064 | | LR | R5,R12 | /*ADDRESS OF CONSUMER */ |
| 0065 | | CDS | R2,R4,RCNTR | /*UPDATE RCNTR AND LH */ |
| 0066 | | BNE | CONS00 | /*IF CHANGED, START AGAIN */ |
| * | | | | |
| */*CURRENT MESSAGE NOW IN OUT QUEUE, WILL LATER BE | | | | */ |
| */*DEQUEUED BY PROCESS EXECUTING PRODUCER LOGIC | | | | */ |
| * | | | | |
| 0067 | CONSDONE | EQU | * | /*DONE, RETURN TO CALLER */ |

TABLE III

| PRODUCER LOGIC/1: | | PRODVALU IS NEWLY PRODUCED CREDIT VALUE MADE AVAILABLE BY AN INPUT PROCESS | | |
|---|---|---|---|---|
| 0080 | PROD100 | EQU | * | /*PRODUCER LOGIC PART 1 */ |
| 0081 | | L | R9,RCNTR | /*GET RCNTR VALUE */ |
| 0082 | | LTR | R1,R9 | /*IS IT >= ZERO? */ |
| 0083 | | BM | PROD200 | /*BRANCH TO PRODUCER */ |
| * | | | | /*LOGIC 2 IF NEGATIVE */ |
| 0084 | | A | R1,PRODVALU | /*ADD NEWLY PRODUCED VALUE */ |
| 0085 | PROD110 | EQU | * | /*R1 HAS NEW VALUE */ |
| 0086 | | CS | R9,R1,RCNTR | /*ALTER VALUE IF NOT CHANGED */ |
| 0087 | | BE | DONE | /*BRANCH IF SUCCESSFUL TO */ |
| * | | | | /*PRODUCER LOGIC 2 */ |
| 0088 | | B | PROD100 | /*BRANCH IF NOT ALTERED */ |
| * | | | | /*BECAUSE RCNTR HAD CHANGED */ |

TABLE IV

| | | | | |
|---|---|---|---|---|
| PRODUCER LOGIC/2: | | FIRST PROCESS TO ENTER BECOMES COMPLETING PROCESS FOR SUBSEQUENT PROCESSES THAT MAKE CREDIT AVAILABLE | | |
| 0100 | PROD200 | EQU | * | /*PRODUCER LOGIC PART 2 */ |
| 0101 | | L | R1,APPCNTR | /*GET APPCNTER */ |
| 0102 | | LR | R4,R1 | /*COPY IT */ |
| 0103 | | A | R4,PRODVALU | /*NEWLY PRODUCED VALUE */ |
| | | | | /*ADDED TO APPCNTR */ |
| 0104 | | CS | R1,R4,APPCNTR | /*TRY PLACING OUR VALUE */ |
| | | | | /*INTO APPCNTER */ |
| 0105 | | BNE | PROD200 | /*IF APPCNTR CHANGED, TRY */ |
| | | | | /*AGAIN */ |
| 0106 | | LTR | R1,R1 | /*WAS APPCNTR GREATER THAN */ |
| | | | | /*ZERO? */ |
| 0107 | | BP | DONE | /*BRANCH YES, WE HAVE PASSED */ |
| | | | | /*THE OBLIGATION AND ARE DONE */ |
| 0108 | | LTR | R4,R4 | /*IS NEWLY PRODUCED VALUE */ |
| | | | | /*GREATER THAN ZERO? */ |
| 0109 | | BNP | DONE | /*BRANCH IF NOT */ |
| | */*HERE CURRENT PROCESS MUST COMPLETE AND WILL ACCEPT ALL | | | */ |
| | */*OBLIGATIONS TO APPLY CREDIT UNTIL IT CAN ZERO APPLY | | | */ |
| | */*COUNTER | | | */ |
| 0110 | LOOP1 | EQU | * | /*RE-ENTRY INTO LOGIC WITH */ |
| | | | | /*NEW CREDIT */ |
| 0111 | | LR | R8,R4 | /*SAVE A COPY OF THE VALUE */ |
| | | | | /*TO APPLY */ |
| 0112 | LOOP1A | EQU | * | /*RE-ENTRY INTO LOGIC WITH */ |
| | | | | /*SAME CREDIT */ |
| 0113 | PROD220 | EQU | * | /*BEGIN 'DO' LOOP */ |
| 0114 | | LTR | R4,R4 | /*ARE WE OUT OF CREDIT? */ |
| 0115 | | BZ | PROD250 | /*BRANCH YES */ |
| 0116 | | CLC | LH,=F'0' | /*IS LH ZERO? */ |
| 0117 | | BE | PROD250 | /*BRANCH YES */ |
| | */*PROCESS NOW REMOVES A MESSAGE FROM THE END OF THE OUT | | | */ |
| | */*QUEUE. SINCE ONLY ONE PROCESS MAY ACCEPT PASSED | | | */ |
| | */*OBLIGATIONS AT A TIME, IT IS SAFE TO FOLLOW THE CHAIN TO | | | */ |
| | */*THE END OF THE QUEUE WHERE THE FIRST MESSAGE TO WAIT IS | | | */ |
| | */*POSITIONED (PROPER USE OF CS WHEN PLACING A MESSAGE AT | | | */ |
| | */*THE HEAD OF THE QUEUE MANDATES THIS SEQUENCE). CS MUST | | | */ |
| | */*BE USED TO REMOVE THE MESSAGE WHEN IT IS CHAINED | | | */ |
| | */*DIRECTLY OFF THE LIST HEAD. CS MAY BE USED WHEN IT IS | | | */ |
| | */*CHAINED OFF OF OTHER QUEUED MESSAGES. | | | */ |
| 0118 | PROD230 | EQU | * | /*RETRY IF PRIOR POINTER */ |
| | | | | /*CHANGES */ |
| 0119 | | LA | R14,LH | /*PRIOR POINTER FOR QUEUE */ |
| 0120 | | L | R12,LH | /*POINTER TO FIRST MESSAGE */ |
| 0121 | PROD232 | EQU | * | /*SCAN TO END OF QUEUE */ |
| 0122 | | CLC | 0(R12),=F'0' | /*IS THIS THE LAST IN THE */ |
| | | | | /*MESSAGE? */ |
| 0123 | | BE | PROD234 | /*BRANCH YES */ |
| 0124 | | LR | R14,R12 | /*NEW PRIOR POINTER ADDRESS */ |
| 0125 | | L | R12,0(,R12) | /*ADDRESS OF NEXT IN QUEUE */ |
| 0126 | | B | PROD232 | /*END OF SCAN 'DO' LOOP */ |
| 0127 | PROD234 | EQU | * | /*HAVE LAST MESSAGE IN THE */ |
| | | | | /*QUEUE */ |
| 0128 | | SR | 15,15 | /*ZERO */ |
| 0129 | | CS | R12,R15,0(R14) | /*UPDATE PRIOR POINTER TO */ |
| 0130 | | BNE | PROD230 | /*BRANCH IF IT CHANGED */ |
| | */*ALLOW THE MESSAGE TO BE TRANSMITTED BY PASSING IT TO | | | */ |
| | */*THE OUTPUT ROUTINE 31 | | | */ |
| 0131 | | L | R15,=V(OUTPRCS) | /*OUTPUT PROCESS */ |
| 0132 | | BALR | R14,R15 | /*ALLOW TRANSMISSION OF R12 */ |
| | | | | /*MESSAGE */ |
| 0133 | PROD240 | EQU | * | /*ADD ONE TO RCNTR */ |
| 0134 | | L | R1,RCNTR | |
| 0135 | | LR | R2,R1 | /*COPY OF RCNTR */ |
| 0136 | | A | R2,=F'1' | /*ADD ONE (FOR MESSAGE JUST */ |
| | | | | /*SENT) */ |
| 0137 | PROD244 | EQU | * | /*R2 SET TO NEW VALUE */ |
| 0138 | | CS | R1,R2,RCNTR | /*UPDATE */ |
| 0139 | | BNE | PROD240 | /*BRANCH IF CHANGED */ |
| 0140 | | S | R4,=F'1' | /*ONE LESS CREDIT WE MUST */ |
| | | | | /*APPLY */ |
| 0141 | | B | PROD220 | /*GO BEGIN LOOP AGAIN */ |
| 0142 | PROD250 | EQU | * | /*OUT OF CREDIT OR NOBODY */ |
| | | | | /*QUEUED */ |

TABLE IV-continued

```
             */*EITHER ALL THE NEW CREDIT HAS BEEN APPLIED OR NO MORE      */
             */*MESSAGES ARE QUEUED. HOWEVER, MORE CREDIT MAY BE           */
             */*ARRIVING OR MORE MESSAGES MAY BE QUEUEING.                 */

0143            LTR   R4,R4           /*ANY CREDIT NOT YET APPLIED         */
0144            BNP   PROD270         /*BRANCH IF NOT                      */
0145  PROD260  EQU   *               /*CHECK NEW RCNTR VALUE              */
0146            L     R9,RCNTR        /*CURRENT RCNTR VALUE                */
0147            LTR   R7,R9           /*ENSURE IT IS >= ZERO               */
0148            BM    LOOP1A          /*BRANCH IF IT IS NEGATIVE,          */
                                      /*WE STILL HAVE CREDIT TO            */
                                      /*APPLY                              */
0149            AR    R7,R9           /*ADD LAST KNOWN RCNTR VALUE         */
0150  PROD264  EQU   *               /*HERE WHEN R7 SET                   */
0151            CS    R9,R7,RCNTR     /*APPLY CREDIT IF RCNTR NOT          */
                                      /*CHANGED                            */
0152            BNE   PROD260         /*BRANCH IF COUNTER HAD              */
                                      /*CHANGED                            */

*/*ALL AVAILABLE CREDIT APPLIED. HAVE OTHER PROCESSES         */
             */*PASSED OBLIGATION?                                         */

0153  PROD270  EQU   *               /*UPDATE APPCNTER                    */
0154            L     R1,APPCNTR      /*CURRENT VALUE OF APPCNTR           */
0155            LR    R4,R1           /*COPY                               */
0156            SR    R4,R8           /*MINUS WHAT WAS JUST                */
                                      /*APPLIED                            */
0157            CS    R1,R4,APPCNTR   /*IF NOT CHANGED, SET TO             */
                                      /*VALUE THAT STILL MUST BE           */
                                      /*APPLIED                            */
0158            BNE   PROD270         /*BRANCH IF CHANGED                  */
0159            LTR   R4,R4           /*STILL CREDIT TO APPLY?             */
0160            BNZ   LOOP1           /*BRANCH YES                         */
0161  DONE     EQU   *               /*DONE WITH PRODUCER LOGIC           */
```

Referring now to FIGS. 2 and 3 and to Tables I through IV, the consumer logic and producer logic operations of the first embodiment will be described in detail.

The consumer and producer logic operations are executed within existing processes, with the consumer logic being executed by one of the sending processes of FIG. 3, and the producer logic by one or more of the input processes. The principal data fields against which the consumer and producer operations execute are described in Table I. Each line of the table describes a data area in the main store. RCNTR and LH are the double word portion of the RSV 36, while APPCNTR is the third field of the RSV.

A process invokes one of the below-described logics by use of the well-known IBM System/370 CALL macroinstruction which invokes the specified logic. The calls to the logics are assumed to be local calls that use standard parameter list formats and standard linkage conventions. It is assumed that a return procedure is executed following the call and appropriate action is performed by the caller.

CONSUMER LOGIC

When one of the local processes 36-37 has a message to be forwarded through the communications service 25, it calls the consumer logic 30, illustrated in Table II. A local process calling the consumer logic 30 executes against RCNTR and LH of the RSV 39. If RCNTR contains a value greater than zero, the local process forwards the message through the consumer logic to the output routine 31 and decrements RCNTR by one. Otherwise, the message is enqueued, a pointer to the message is placed in LH, and RCNTR is decremented by one.

Assuming that the consumer logic 30 is called by a local process with a message to be forwarded, the process first obtains the current credit in the RCNTR and loads the value of RCNTR into register R0. The credit count in register R0 is decremented by 1 and the result placed in register R2. In this case, decrementing the contents of R0 represents provision of a unit of service by the communication service 20 to a process with a message to send. Next, the contents of R2 are tested. If the contents are less than 0, then, as stated, no credit is available and the message will have to be enqueued to await the delivery of credit to the communication service 20.

In the case where a waiting message must be enqueued, the local process, in steps 0060 through 0066, decrements the count in the RCNTR and enqueues the current message (CM) by adding it to the head of the output queue. This is accomplished by invoking the CDS instruction to execute, in a single atomic operation, against the double word in storage consisting of the RCNTR and the LH. Although this procedure is well known and is described in both the IBM System/370 Principles of Operation and in Hwang and Briggs, it will be recapitulated here for convenience.

The calling process first tests the value of the RCNTR in steps 0051 through 0053. If the RCNTR value is positive, it is decremented by one in step 0054 and the CS operation is used in step 0055 to place the decremented value into the RCNTR. In this regard, R2 holds the previous RCNTR value, and R4 holds the decremented value. The present value in RCNTR is compared to the value in R2, and if equal, credit is still available and the decremented value of RCNTR is still correct. Then the new decremented value is entered into the RCNTR by the CS instruction and the consumer logic, in step 0057, calls the output routine 31 for transmission of the message.

Returning to step 0055, if the value in the RCNTR has been altered, the branch instruction in step 0056 returns the process to step 0050, sending it through the consumer logic operation once again.

Figure 4:
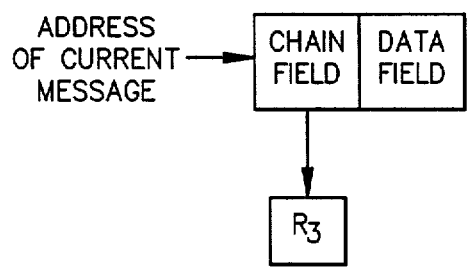
FIG. 4 illustrates the structure of an element to be enqueued by the consumer logic of FIG. 3.

If a message-producing process reaches step 0053 and determines that the RCNTR value is not greater than zero, it enqueues the message and decrements the counter in steps 0060–0066, using the CDS operation. Thus, with the current RCNTR value in R2 and R4, the process in step 0061 decrements the current count by subtracting one from the contents of R4 and loads the contents of the LH into R3. In step 0063, the address of the last message to be placed in the output queue (that is, the address held in the LH) is placed in the chain field of the current message (whose address is in R12). In this regard, reference to FIG. 4 illustrates the format of a message to be queued. As is conventional an enqueued message has a chain field for storing the address (pointer) of the next message in a queue, and a data field for storing message data. Since the address of the current message (i.e. the contents of R12) is to become the new LH, it is loaded into R5 in step 0064 in preparation for the CDS operation of step 0065.

At step 0065, the first operand, contained in R2 and R3, consists of the RCNTR value loaded at step 0051 and the existing LH value loaded at step 0062; the second operand consists of the values of the RCNTR and the LH; and the third operand has the decremented value of the RCNTR and the address of the current message being added to the output queue in R4 and R5, respectively. If the RCNTR value has been altered or if another message has been enqueued between the time the currently-executing process proceeds from steps 0051 through 0065, the change to the RCNTR or LH value will be detected by the branch operation in step 0066. In this case, the process is directed to perform the consumer logic operation again starting at step 0050. If the CDS operation of step 0065 is successful, the contents of R4 and R5 decrement the RCNTR value and place the current message address in the LH.

PRODUCER LOGIC

Input processes 34 through 35, upon extracting credit from incoming messages, provide the credit for outgoing message transmission by calling the producer logic 32. In the instant embodiment, the producer logic consists of two sections, entitled producer logic 1 and producer logic 2, respectively.

Producer logic 1, presented in Table III, executes against the RCNTR and a variable labelled PRODVALU. The variable PRODVALU is newly produced credit value extracted by an input process from an incoming message, which is to be added to the RCNTR value if the output queue is empty, or applied against the output queue if the queue has messages waiting for transmission. In the normal case where there are no messages in the output queue (indicated by a positive value in the RCNTR), the contents of the RCNTR are incremented by the newly produced credit value. Contrastingly, if the value of RCNTR is less than zero, producer logic 1 provides the process with a branch to producer logic 2, which is explained in greater detail below.

Thus, when one of the input processes 34 through 35 detects a credit value in the PRODVALU field of an incoming message, it calls producer logic 1. Initially, the calling process loads and tests the RCNTR value in steps 0080–0082 and then, assuming a positive or zero value, add the contents of the newly produced credit value by a CS operation implemented in steps 0084 through 0086. If the transfer is successful, producer logic 1 is exited in step 0087, if not, step 0088 forces the process to again test the RCNTR contents by returning to step 0080.

In the case where the contents of RCNTR are negative, indicating that messages have been queued, the process offering the newly produced credit value is branched, in step 0083, to producer logic 2.

When a process with new credit value is branched to producer logic 2, one or more messages (such as messages $MSG_1$–$MSG_n$ in the queue 37 of FIG. 3) are waiting on queue and credit is available for dequeueing at least some of the messages. It must be kept in mind that, while the credit is being applied to queued messages, one or more messages may be added to the queue and additional available credit may be offered by one or more input processes.

Using the technique of obligation passing and the CS atomic instruction, allocation of credit to queued messages is managed by way of the APPCNTR that serves to serialize the application of new credit and select a completing process from among input processes concurrently offering credit when there are queued messages. In this regard, if the APPCNTR is zero, no resource is being applied and an input process, once having performed the initiation operation of producer logic 1 and being branched to producer logic 2, can become the completing process by successfully placing its newly produced credit value into the APPCNTR through the CS atomic operation. When this occurs, that input process becomes the receiver for obligations to apply credit produced by input processes while that process is dequeueing the messages from the output queue.

On the other hand, if an input process offers newly produced credit while a completing process is applying credit to queued messages, it will exit producer logic 1 and detect a non-zero value in the APPCNTR. In this case, the input process passes the obligation to apply its newly produced credit by adding it to the APPCNTR through the CS atomic operation, thereby passing the obligation to apply that credit count to the current process. The current process applying credit is then responsible for applying all of the credit and this credit-offering process is released without having to wait to apply its credit or to insure that its credit is applied; this process has passed the obligation and its part in credit application is complete.

A more detailed explanation of identification of a obligation passing to a completing process now follows with reference to Table IV. In Table IV, when a process is branched to producer logic 2, it first loads the contents of APPCNTR in R1, copies the value to R4, and adds its newly produced value to the APPCNTR value in R4. Then, the CS operation is used in step 0104 to place the augmented APPCNTR value in R4 into the APP CNTR. When the augmented value is finally placed in the APPCNTR, the original value of the APPCNTR is tested in step 107 to determine if it was greater than zero. If greater than zero, another process is applying credit. Since the APPCNTR value has been augmented by the amount of credit available, the obligation to apply this credit has been passed and the process offering the newly produced value is released from any further obligation based upon the credit it has just added to the APPCNTR.

If the test of step 0107 detects an APPCNTR value of zero, the current process must apply at least its credit to queued messages; further, it must complete the execution against the RSV 36 by zeroing the APPCNTR; finally, it must accept obligations to dispose of credit produced before it zeroes the APPCNTR.

Once a process reaches step 0110, it must dequeue messages for so long as there is credit available for transmission and messages in the output queue. Credit application under these conditions is implemented by LOOP 1, including steps 110 through 0160. Each time LOOP 1 is entered, an augmented APPCNTR value will have been placed in R4. The credit value in R4 is used to control operation of a "DO" loop extending from step 0113 through step 0141. In the DO loop, the output queue is scanned (steps 0118-0130) to its end where the message first enqueued (the list anchor) is positioned. This scan is performed with each iteration of the DO loop to avoid conflict with messages being added at the head of the queue. When the end of the queue is reached, the last message is detached and provided to the output routine in steps 0131 and 0132 for transmission.

Each time a message is detached from the end of the queue, the RCNTR value is augmented by one in steps 0133-0137 using the CS atomic operation (step 0136). Next, the augmented credit value in R4 is decremented by one at the end of the DO loop in step 0140, after which its value is tested in steps 0114 and 0115. If the credit has not been exhausted, the LH is inspected in step 0116. If the LH is not zero, indicating that the queue has not been fully depopulated, the DO loop is executed again.

The DO loop is exited if the augmented credit value in R4 has been reduced to zero (step 0116), or if the LH value is zero (step 0117). In this latter regard, queueing or listing is a well-known process wherein the chain field of the last item in a queue is set to zero, which indicates the end of the queue. The address of the first message in the queue is held in the LH. As messages are dequeued using steps 0118-0130, a zero is placed in the chain field of the message immediately preceding the message being detached from the queue. If there is sufficient credit, the zero will eventually be moved to the chain field of the last message added to the queue, whose address is in the LH. When this last message is detached and transmitted, a zero is placed in the LH, and it is this value that indicates, in step 0117, that the queue has been fully depopulated.

When an applying process completes the DO loop, either through exhaustion of credit or full depletion of the output queue, the producer logic branches to step 0142. Then R4 is tested to determine whether credit has been exhausted (steps 0143 and 0144), and, if not, whether one or more messages have been added to the output queue. The queue is checked indirectly by testing the contents of the RCNTR. Since, in the DO loop described above, the RCNTR is incremented each time a message is removed from the queue (steps 0133-0138), the counter will have a value of zero when all of the queue messages have been transmitted. Thus, in steps 0145-0147, the RCNTR is tested and if it has a non-negative value (no messages queued), that value will be augmented by the remaining credit in steps 0149-0150, using the atomic CS operation.

If, on the other hand, step 0146 detects that there have been messages enqueued, producer logic 2 operation will return to the DO loop through step 0112.

At step 152, all previously known credit will have been applied to queued messages and/or to RCNTR. The APPCNTR will be updated to indicate application of previously-known credit and to detect any additional credit provided by another process through obligation passing. Updating is done by an atomic CS instruction in steps 0154-0157. When updating, the amount of credit just applied (stored into R8 in step 111) is subtracted from a copy of the APPCNTR value in R4 (step 0156) and the resulting R4 value is placed into the APPCNTR by the CS operation of step 0157. When the operation is successful, the contents of R4 are tested. If 0, no additional credit was placed in the APPCNTR, during the time the process moved from step 0105 to step 0156 (and 158 through 160), and the process has zeroed the APPCNTR by the CS operation of step 0157. This corresponds to the completion operation.

If, in step 0159, R4 is not zeroed, more credit is in the APPCNTR. This credit must either be applied to newly-queued messages or moved to RCNTR; so, in step 0160 a branch to step 0110 is taken. If no messages have queued, the process will go from step 0110 to 0117; branch from step 0117 to step 0142; move the APPCNTR contents to RCNTR (steps 0143-0151); zero the APPCNTR if no additional credit has been supplied by an obligation passing process (steps 0152-0158); and fall through step 0160 to step 0161, whence it exits the producer logic.

When the producer logic is exited by placement of a 0 value in the APPCNTR, the next process to place a credit value in the APPCNTR will become the completing process, and will be responsible for accepting passed obligations to apply credit to queued messages or place credits in RCNTR; in either case the obligation also entails zeroing the APPCNTR (performing the completing operation).

SECOND EMBODIMENTS: LIST MANAGEMENT

As stated above, one of the principal responsibilities of the operating system of a central electronics facility is to manage the access of multiple, independent processes to data lists in main store. Such lists can comprise, for example, look-aside record chains in a global journal and chains of queue anchors and messages within a global queue manager. Typically, a global queue manager serializes the access of asynchronously-operating processes to a queued list by permitting one process to use the list at a time. Thus, only one process at a time is permitted to add to the list, scan the list, or delete from the list.

Typically, access to the list is afforded through a lock which a process must control before being enabled to use the list. If a process inspects the lock while another process is using the list, the lock will have a set indication, causing the non-using process to continually execute against the lock until it is available. This continuous execution is referred to as "spinning" and represents a loss of productive time and efficiency for the process.

Another technique of serialization against a lock is to suspend a process requiring access to the list when another process has set the lock. When the lock becomes available, the suspended process is restarted and resumes execution. As is known (Hwang and Briggs, page 563) restart operations increase the overhead cost, and reduce the efficiency of an operating system.

The ability to have multiple processes simultaneously accessing linked data lists without requiring exclusive control locks is desirable because it will eliminate spinning and suspension. Further, simultaneous access can prevent a low-priority or failing process blocking other processes. Thus multiple concurrent access can enhance the operation and efficiency of general system services in multiprogramming and multiprocessing environments.

The second embodiment of the method of the invention involves logic which, using the IBM System/370 Atomic Instructions CS and CDS described above and a resource status variable, can provide multiple concurrent access to linked data lists without the requirement for exclusive control latches, even when elements must be removed from the middle of the list.

Figure 5:
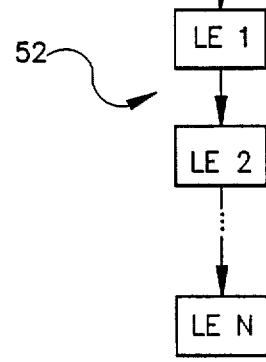
FIG. 5 illustrates a second embodiment of the method of the invention which provides concurrent, lock-free, serialized access to a linked list for multiple processes.
Figure 5:
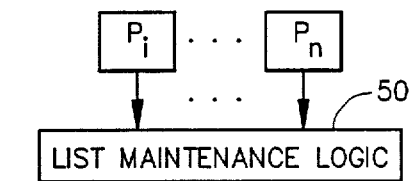

Referring to FIG. 5, a global queue manager such as one designed to operate in the IBM System/370 includes list maintenance logic 50 that serializes the access of asynchronous processes $P_i$-$P_n$ to a linked list or queue 52 comprising list elements LE 1 - LE N. The list 52 utilizes conventional chain field linkage described above to provide serial connectivity between the list elements.

Figure 6:
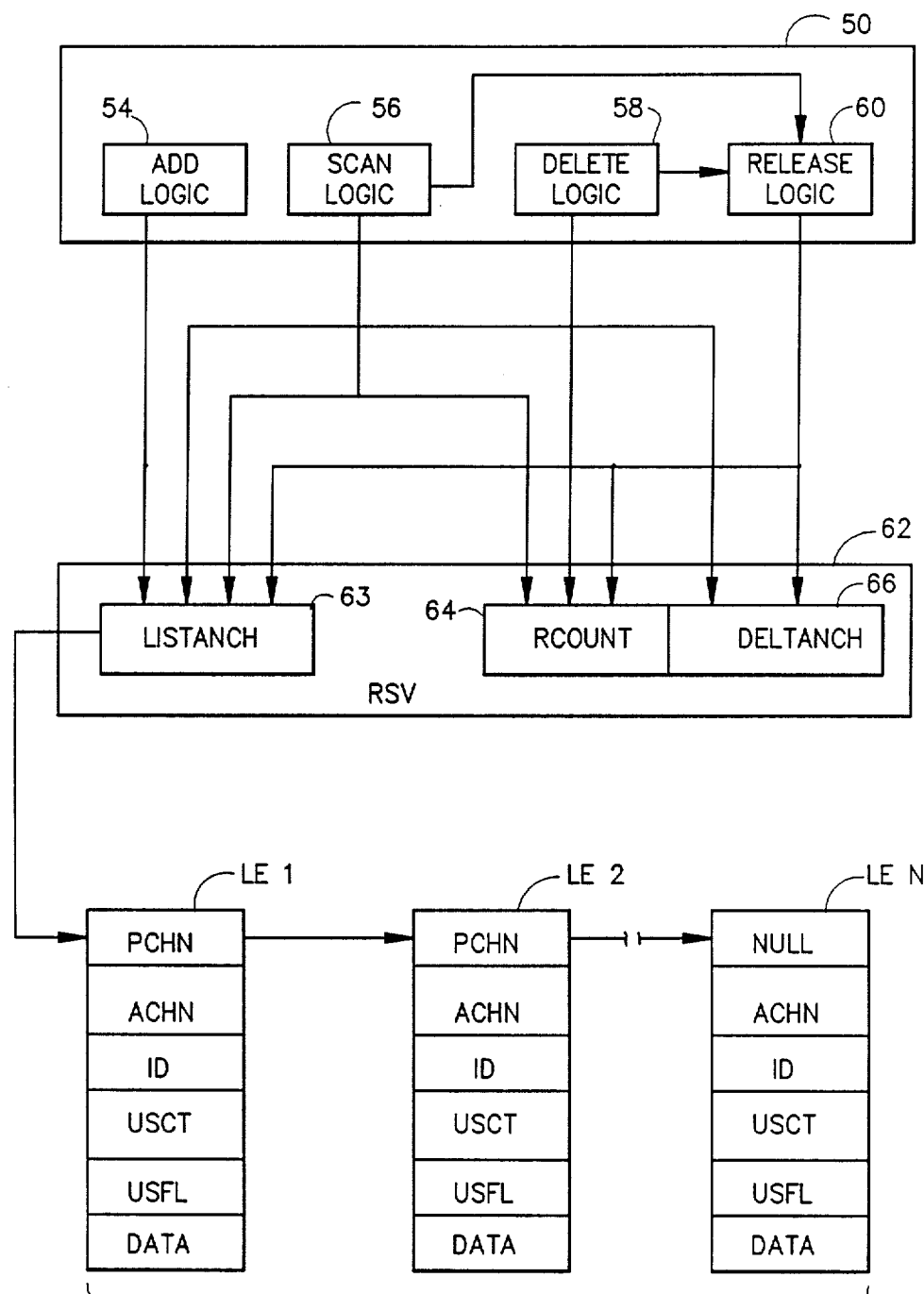
FIG. 6 depicts the relationship between the list access logic of FIG. 5 and a resource status variable.

Referring to FIG. 6, each list element in the list 52 includes at least six data fields PCHN, ACHN, ID, USCT, USFL, and DATA. The primary chain (PCHN) field conventionally links the list element in the list 52. The PCHN field of each list element contains a pointer to the subsequent list element, and the PCHN field of the last element in the list (LE N) contains a null, indicating the tail of the list 52. As discussed hereinbelow, the list 52 is referred to as the primary and is formed from the linkage of the list element PCHN fields. An alternate chain (ACHN) field in each list element provides linkage between list elements in an alternate chain having a purpose discussed below. A unique identification code is placed in the identification (ID) field of each list element to provide a specific identifier for that element. A user count (USCT) field follows the identification field; in the preferred embodiment, USCT is a 3-byte field used to accumulate a count of processes currently using the list element for one purpose or another. A use flag (USFL) field consists of one byte for storage of DELETE and OFFCHAIN flags, each used for a later-discussed purpose. Finally, the DATA field is provided for the particular data record to be associated with the list element.

LE 1 constitutes one end of the list 52, and its address is the list anchor (LISTANCH), which is held by the list maintenance logic 50 to afford access to the list.

In the description that follows, it is assumed that the elements of the list 52 are unordered, that elements deleted from the list are to be released, for example, to general storage, and that contention for access to the list is restrained enough that, from time to time, the list will not be used. Without periodic nonuse of the list, it would not be possible to provide for disposition of elements deleted from the list as explained below.

Reference to FIG. 6 will provide an understanding of the list maintenance logic 50, the RSV, and the list structure employed in this embodiment. The list maintenance logic 50 includes add logic 54, scan logic 56, delete logic 58, and release logic 60. The logics $54 \geq 60$ operate with reference to a control structure comprising a resource status variable (RSV) 63 made up of three words that are held, preferably, in the main storage utilized by the operating system of a CPU. The RSV 62 includes a list anchor (LISTANCH) 63 and a pair of contiguous words stored on a double-word boundary, the first of which is a reader's count (RCOUNT) 64 and a delete list anchor (DELTANCH) 66.

As is conventional, LISTANCH has a value (called a pointer) corresponding to the storage address of a listhead if the list is populated, or to 0 (null) if the list 52 is fully depopulated. In keeping with the example of FIG. 6, LISTANCH points to LE 1, which is the list header in the primary chain extending to LE N through the PCHN fields of the elements forming the list 52.

The RSV 62 also consists of a pair of contiguous words RCOUNT 64 and DELTANCH 66, the first of which is located on a double word boundary in the main storage. The RCOUNT 64 is a counter whose value corresponds to a count of processes which are currently scanning or deleting from the list 52. The count is called a reader's count (thus, RCOUNT). The DELTANCH 66 contains a pointer to the first element of a list of elements in the primary chain that have been marked for deletion from the list 52 and formed into a (delete) list through their ACHN fields. The pointer in the DELTANCH 66 is referred to as the delete list anchor (thus, DELTANCH).

In the operation of the second embodiment of the invention, each process gaining access, through the list maintenance logic 50, to the list 52, increments the reader's count in RCOUNT 64 before scanning or deleting from the list. After (successfully or unsuccessfully) completing a scan or deletion, a process operating through the list maintenance logic 50 decrements RCOUNT 64. If the subtraction results in a positive, non-zero value, the process is permitted to exit from the list without any further obligation. A zero resulting from the decrementation of RCOUNT 64 indicates to a process that it is the last of a group of processes that have concurrently used the list 52. The last of a group of concurrently-using processes must determine whether it is the recipient of obligations passed from other processes exiting the list before it.

In this embodiment, more than one process is permitted access to the list 52 only for the purposes of scanning or deleting from the list. While add logic 54 permits access to the list for the purpose of attaching list elements to the head of the list, the add logic 54 is serialized by means of a CS atomic operation so that only one list element can be added to the list 52 at a time. Use of the add logic 54 does not result in the passage of any obligations to processes that add to, scan, or delete from the list while an element is being added.

In order to confront and solve the problem of permitting one process to delete an element from the list 52 at precisely the same time that another process is inspecting the element, the PCHN field of the element being deleted is left unchanged, while the deleting process marks the element for deletion and adds the element to a delete list anchored by DELTANCH 66. This contrasts with the conventional mode of element deletion in which the PCHN field of the list element is altered when the element is deleted from a list. If the conventional mode were followed under the condition of providing concurrent access to more than one process, a process could be directed off of the list 52 if it were to inspect the PCHN field of an element being deleted immediately after the field is changed.

Instead, in the method of the invention, each deleting process follows the procedure of marking an element for deletion and chaining the element to the delete list through the element's ACHN field. The deleted element is now removed from the list according to the viewpoint of processes subsequently scanning the list because the element has been marked. However, since the PCHN field of the deleted element is unchanged, succeeding elements can reliably scan the list 52.

The passed obligation in the second embodiment consists of the performance of the following set of procedures. If no other process is scanning or deleting from the list 52 when a process finishes scanning or deleting, the finishing process will decrement RCOUNT 64 to zero. The zero in RCOUNT 64 will cause the process to determine whether a delete chain of elements exists. If not, the process is permitted to exit the list maintenance logic 50 without further requirement. If, however, a delete list has been formed, the process must assume the obligation of first removing the delete list elements from the primary chain. Once all of the delete list elements have been removed from the primary chain, the process of deletion is completed and the process is then obliged to free the elements in the delete list. Thus, the completion operation of the second embodiment involves completing the deletion of elements begun by processes preceding the completing process (which receives the obligations).

The completion operation of removing elements on the delete list from the primary chain and then releasing the elements on the delete list is the "passed obligation," and it can only be performed by one process when no other process is currently scanning or deleting from the list 52.

If a subsequent process is scanning or deleting from the list 52 after a completing process has finished the first portion of the completion operation—removing the deleted elements from the primary chain—but before the completing process has begun freeing the delete list elements, the obligation of freeing the partially processed delete list elements is passed to a subsequent process. In this way, list elements may be marked for deletion and the deletion obligation (the completion operation) passed by means of a single atomic operation (CDS) while simultaneously insuring (RCOUNT equal to 1) that there are no other processes scanning the list 52. This is possible because the delete list anchor and the reader's count are in the same double word and can simultaneously and atomically be tested and modified by the CDS operation.

It should be noted that the second embodiment of the invention differs from the first embodiment in the way in which the process receiving the obligation to complete is selected. In the first embodiment, generally, the first process to offer credit receives the obligation to perform the completion operation (clearing the APPCNTR), while in the second embodiment, the last of a group of processes using the list 52 receives the obligation to zero the reader's count and dispose of delete list elements.

Figure 7:
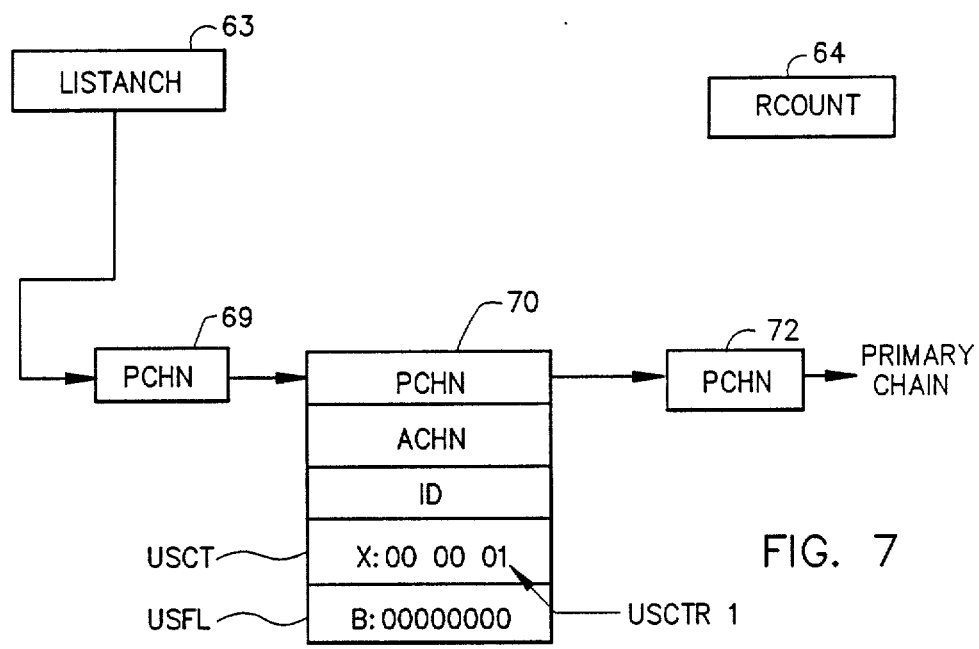
FIGS. 7-10 depict the alteration of the list of FIG. 5 according to the second embodiment of the invention.
Figure 8:
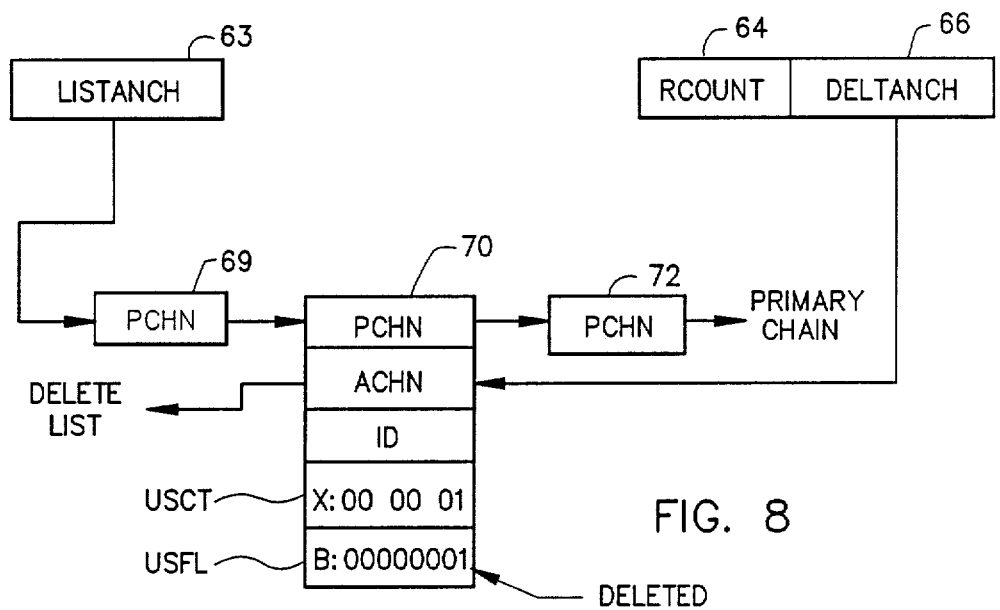
Figure 9:
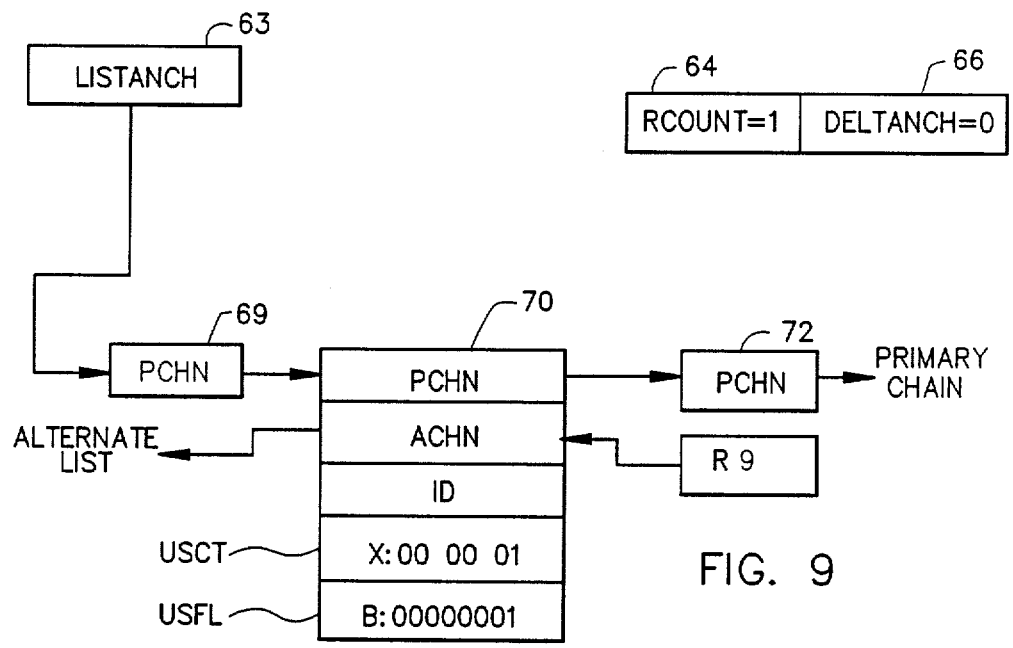
Figure 10:
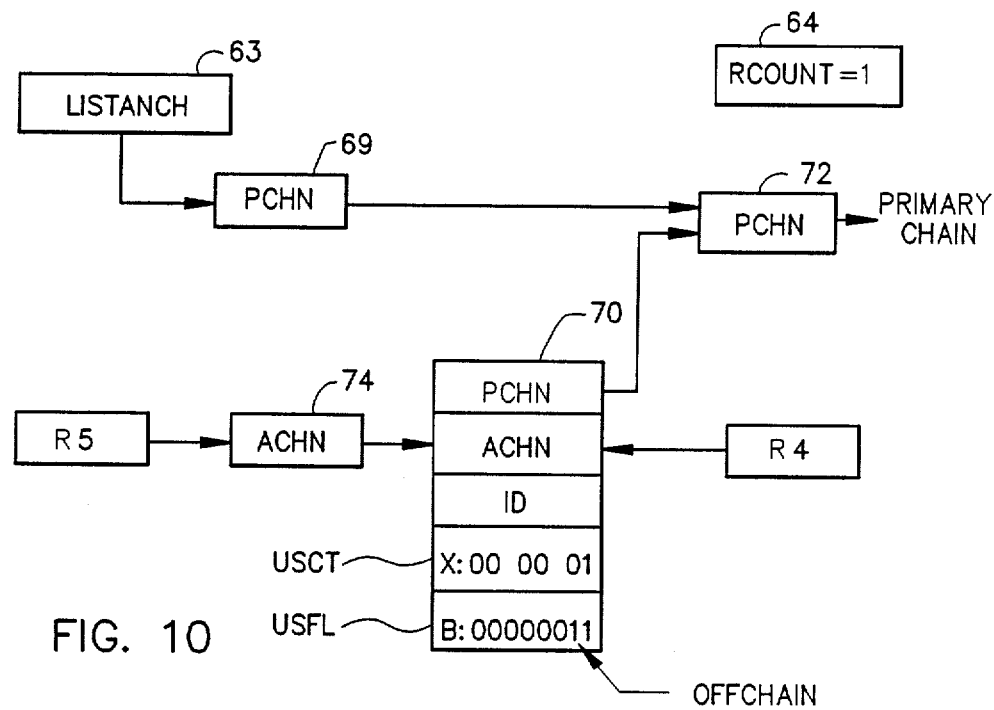

FIGS. 7-10 illustrate an exemplary situation in which concurrent access is granted to the list 52. In FIGS. 7-10, the list 52 is represented by its first three elements, indicated by reference numerals 69, 70, and 72. The elements 69-72 are conventionally linked in a primary chain through the pointers contained in their PCHN fields. In the discussion following, the list element 70 is identified for use by a scan processing operation (FIG. 7), is marked for deletion by a delete processing operation (FIG. 8) and then is first removed from the primary chain and finally freed from the secondary chain by performance of a passed obligation (FIGS. 9 and 10).

With regard to a specific instantiation of the second embodiment of the invention, and referring once more to FIG. 6, processes serially access the list 52 through the list maintenance logic 50 to add elements to the list by using ADD LOGIC 54, and concurrently access the list 52 to scan the list by means of SCAN LOGIC 56, to delete elements from the list by using DELETE LOGIC 58, and to release delete list elements under the conditions described above.

Thus, a process will enter the list maintenance logic 50 by calling a routine embodying the logic corresponding to the function the process is to perform with regard to the list 52. The calls to the logics 54-60 are assumed to correspond to the CALL macroinstruction of the IBM System/370. The calls are also assumed to be local calls using standard parameter list formats and standard linkage conventions.

Tables V-X presented below provide specific exemplars of the logics 54-60 in the well-known IBM System/370 assembly language format described above in relation to the first embodiment. Table V contains the data structures used in Tables VI-X. In Table V, LISTANCH is a full word; RCOUNT and DELTANCH are contiguous full words on a double word boundary and are referred to collectively as SHRLATCH. A pair of return code flags SUCCESS and NO SUCCESS are defined to indicate the outcome of a scan or delete operation. The list element structure is defined to conform with that illustrated in FIG. 6 for the list elements LE 1 - LE N. General registers that are assigned to a process out of the complement of available general registers are defined, for each process, as registers R0-R15.

TABLE V

| DATA AREAS AND EQUATES USED THROUGHOUT THE ASSEMBLER EXAMPLES | | | | |
|---|---|---|---|---|
| LISTANCH | DC | A(0) | /*LIST ANCHOR | */ |
| SHRLATCH | DS | 0D | /*DOUBLE-WORD BOUNDARY | */ |
| RCOUNT | DC | F'0' | /*COUNT OF CURRENT USERS OF | */ |
| | | | /*LATCH | */ |
| DELTANCH | DC | A(0) | /*ANCHOR FOR PENDING DELETES | */ |
| */*DEFINE RETURN-CODE VALUES RETURNED TO CALLER IN R15 | | | | */ |
| SUCCESS | EQU | 0 | /*VALUE RETURNED IF SUCCESS | */ |
| NOSUCCES | EQU | 4 | /*VALUE RETURNED IF NO SUCCESS | */ |
| */*DEFINE THE LIST ELEMENT STRUCTURE AS A DUMMY SECTION | | | | */ |
| ELEMENT | DSECT | . | /*DUMMY SECTION - | */ |

TABLE V-continued

DATA AREAS AND EQUATES USED THROUGHOUT THE ASSEMBLER EXAMPLES

| | | | | |
|---|---|---|---|---|
| ELEMPCHN | DS | A | /*PRIMARY CHAIN FOR LIFO QUEUE | */ |
| ELEMACHN | DS | A | /*ALTERNATE CHAIN | */ |
| ELEMIDEN | DS | F | /*ELEMENT IDENTIFIER | */ |
| ELEMCTFL | DS | 0F | /*ELEMENT IN-USE COUNTER AND | */ |
| * | | | /*DELETE FLAG | */ |
| USECTR1 | EQU | X'00000100' | /*USE-COUNT 1'S POSITION VALUE | */ |
| * | | | /*IN WORD | */ |
| ELEMUSCT | DS | FL3 | /*ELEMENT IN-USE COUNTER | */ |
| * | | | /*(0 = NO USERS) | */ |
| ELEMUSFL | DS | X | /*ELEMENT DELETE FLAGS | */ |
| DELETED | EQU | B'00000001' | /*FLAG BIT - IF 1, ELEMENT | */ |
| * | | | /*DELETED | */ |
| OFFCHAIN | EQU | B'00000010' | /*FLAG BIT - IF 1, ELEMENT | */ |
| * | | | /*UNCHAINED | */ |
| ELEMDATA | DS | C | /*DATA BEGINS HERE | */ |
| * | | | | |
| */*DEFINE SYMBOLIC VALUES FOR GENERAL REGISTERS | | | | */ |
| * | | | | |
| R0 | EQU | 0 | | |
| R1 | EQU | 1 | | |
| R2 | EQU | 2 | | |
| R3 | EQU | 3 | | |
| R4 | EQU | 4 | | |
| R5 | EQU | 5 | | |
| R6 | EQU | 6 | | |
| R7 | EQU | 7 | | |
| R8 | EQU | 8 | | |
| R9 | EQU | 9 | | |
| R10 | EQU | 10 | | |
| R11 | EQU | 11 | /*BASE REGISTER FOR DATA AREA | */ |
| R12 | EQU | 12 | /*BASE REGISTER FOR CODE | */ |
| R13 | EQU | 13 | | |
| R14 | EQU | 14 | | |
| R15 | EQU | 15 | | |
| * | | | | |
| */*ASSUMPTIONS - AN ASSEMBLY-LANGUAGE USING STATEMENT AND | | | | */ |
| */*ASSOCIATED INITIALIZATION HAS BEEN DONE FOR THE CODE, | | | | */ |
| */*AND DATA AREAS (EG., R12 FOR CODE, R11 FOR DATA) | | | | */ | is presented in greater detail in Table VI. In the add logic of Table VI, the general register designated as R9 for the calling process is arbitrarily assigned as the base register holding the address of an element to be added to the list 52. As is conventional, the address of the element to be added is referred to as its pointer. The element is added by storage of its address in LISTANCH 63, and by movement of the pointer currently stored in LISTANCH 63 to the PCHN field of the element. This is accomplished by using the CS atomic instruction. As inspection of Table V will disclose, elements are added to the head of the list 52.

storage dedicated to the process. Similarly, steps 199-202 are a conventional return sequence that restores an exiting process to its state prior to calling the routine. Although not illustrated below, it is assumed that such linkages are employed in the scan, delete, and release logics.

The scan logic 56 is detailed in Table VII, which entails a routine that executes against only the RCNTR 63 by increasing the reader's count by one to indicate access of a process to the list 52. A process calling the scan logic routine possesses an identification code corresponding to a list element for which it will scan the

TABLE VI

ADD LOGIC ROUTINE

| | | | | | |
|---|---|---|---|---|---|
| 190 | ADD | STM | R14,R12,12(13) | /*SAVE INPUT REGISTERS | */ |
| 191 | | L | R9,0(,R1) | /*GET POINTER TO ELEMENT | */ |
| | * | | | /*TO ADD | */ |
| 192 | | USING | ELEMENT,R9 | /*ASSIGN BASE REGISTER | */ |
| 193 | | SLR | R8,R8 | /*GET A ZERO | */ |
| 194 | | ST | R8,ELEMCTFL | /*SET FLAGS AND COUNT TO | */ |
| | * | | | /*NULL | */ |
| | * | | | | |
| 195 | | L | R8,LISTANCH | /*CURRENT ANCHOR CONTENT | */ |
| 196 | ADD01 | ST | R8,ELEMPCHN | /*LIFO CHAIN | */ |
| 197 | | CS | R8,R9,LISTANCH | /*ATTEMPT ANCHOR UPDATE | */ |
| 198 | | BNE | ADD01 | /*LOOP IF NOT SUCCESS | */ |
| | * | | | | |
| 199 | | LM | R14,R12,12(13) | /*RESTORE REGISTERS | */ |
| 200 | | LA | R15,SUCCESS | /*ALWAYS SUCCESSFUL | */ |
| 201 | | BR | R14 | /*RETURN | */ |
| 202 | | DROP | R9 | /*RELEASE BASE REGISTER | */ |

It will be evident to the skilled software practitioner that steps 190-194 of Table VI constitute a standard initialization and linkage sequence that preserves the state of the calling process in a retention area of main list 52. Once a process gains access by calling the scan logic routine and incrementing RCOUNT 64, it conventionally scans the list, element-by-element, until it either locates the element for which it is searching by matching the identification code it possesses with the code in the ID field of one of the list elements, or until it reaches the end of the list without locating the element. Whether successful or unsuccessful, once the scan is completed, a scanning process will call the release logic routine of Tables IX and X to determine whether it is the completing process, responsible for filling passed obligations to dispose of elements on the delete list.

TABLE VII

SCAN LOGIC ROUTINE

|   |   | * SCAN |   | /*DO INITIALIZATION | */ |
|---|---|---|---|---|---|
|   |   |   |   | /*PROCEDURE | */ |
| 210 |   | L | R0,RCOUNT | /*CURRENT READER COUNT | */ |
| 211 | SCAN01 | LA | R1,1 | /*COUNTER INCREMENT | */ |
| 212 |   | AL | R1,R0 | /*NEW COUNTER VALUE | */ |
| 213 |   | CS | R0,R1,RCOUNT | /*ATTEMPT THE CHANGE | */ |
| 214 |   | BNZ | SCAN01 | /*LOOP UNTIL SUCCESS | */ |
| 215 |   | L | R9,LISTANCH | /*GET A (FIRST ELEMENT IN | */ |
|   |   |   |   | /*LIST) | */ |
| 216 |   | USING | ELEMENT,R9 | /*SET AS BASE | */ |
| 217 |   | B | SCAN02 | /*ENTER AT TEST FOR WHILE- | */ |
|   |   |   |   | /*LOOPS | */ |
| 218 | SCAN02L | L | R9,ELEMPCHN | /*TO NEXT IN CHAIN | */ |
| 219 | SCAN02 | LTR | R9,R9 | /*TEST FOR NULL POINTER | */ |
| 220 |   | BZ | SCAN02X | /*EXIT LOOP IF NULL | */ |
| 221 |   | C | R6,ELEMIDEN | /*COMPARE FOR IDENT TO FIND | */ |
| 222 |   | BNE | SCAN02L | /*LOOP IF NOT EQUAL | */ |
| 223 | SCAN02X | EQU | * | /*SEARCH EXIT | */ |
| 224 |   | ST | R9,0(,R5) | /*SAVE POINTER TO BLOCK OR | */ |
|   |   |   |   | /*NULL | */ |
| 225 |   | LTR | R9,R9 | /*TEST FOR NULL POINTER | */ |
| 226 |   | BZ | SCANERRX | /*EXIT IF NULL(SUCCESS=OFF | */ |
| 227 |   | L | R0,ELEMCTFL | /*CURRENT USER COUNT | */ |
| 228 | SCAN03 | LA | R1,DELETED | /*FLAG VALUE FOR DELETED | */ |
| 229 |   | NR | R1,R0 | /*AND OLD VALUE WITH FLAG | */ |
| 230 |   | BNZ | SCANERRX | /*DELETED - EXIT NO SUCCESS | */ |
| 231 |   | LA | R1,USECTR1 | /*COUNTER INCREMENT | */ |
| 232 |   | AL | R1,R0 | /*NEW COUNTER VALUE | */ |
| 233 |   | CS | R0,R1,ELEMCTFL | /*ATTEMPT THE CHANGE | */ |
| 234 |   | BNZ | SCAN03 | /*LOOP UNTIL SUCCESS | */ |
|   | */*ELEMENT IS NOW RESERVED FOR THE CALLER - RETURN=SUCCESS |   |   |   | */ |
| 235 |   | CALL RELEASE |   | /*RESET SHARED LATCH | */ |
|   | */*DO RESTORE AND RETURN PROCEDURE |   |   |   | */ |
|   | */*ELEMENT WAS NOT FOUND - RETURN=NOSUCCES |   |   |   | */ |
| 239 |   | SCANERRX CALL RELEASE |   | /*RESET SHARED LATCH | */ |
|   | */*DO RESTORE AND RETURN PROCEDURE |   |   |   | */ |
|   | */*DROP R9 AS BASE REGISTER AFTER REST/RET |   |   |   | */ |

TABLE VIII

DELETE LOGIC ROUTINE

|   |   | * DELETE |   | /*DO INITIALIZATION | */ |
|---|---|---|---|---|---|
|   |   |   |   | /*PROCEDURE | */ |
| 240 |   | L | R0,RCOUNT | /*CURRENT READER'S COUNT | */ |
| 241 | DLET01 | LA | R1,1 | /*COUNTER INCREMENT | */ |
| 242 |   | AL | R1,R0 | /*NEW COUNTER VALUE | */ |
| 243 |   | CS | R0,R1,RCOUNT | /*ATTEMPT THE CHANGE | */ |
| 244 |   | BNZ | DLET01 | /*LOOP UNTIL SUCCESS | */ |
| 245 |   | L | R9,LISTANCH | /*GET A (FIRST ELEMENT IN | */ |
|   |   |   |   | /*LIST) | */ |
| 246 |   | USING | ELEMENT,R9 | /*SET AS BASE | */ |
| 247 |   | B | DLET02 | /*ENTER AT TEST FOR WHILE- | */ |
|   |   |   |   | /*LOOPS | */ |
| 248 | DLET02L | L | R9,ELEMPCHN | /*TO NEXT IN CHAIN | */ |
| 249 | DLET02 | LTR | R9,R9 | /*TEST FOR NULL POINTER | */ |
| 250 |   | BZ | DLETERRX | /*EXIT LOOP IF NULL - (NOT | */ |
|   |   |   |   | /*FOUND) | */ |
| 251 |   | C | R6,ELEMIDEN | /*COMPARE FOR IDENT TO | */ |
|   |   |   |   | /*DELETE | */ |
| 252 |   | BNE | DLET02L | /*LOOP IF NOT EQUAL | */ |
|   | */*CODE FOR LOGICAL DELETION |   |   |   | */ |
| 253 |   | L | R8,ELEMCTFL | /*GET USE CNTR AND FLAGS | */ |

TABLE VIII-continued
DELETE LOGIC ROUTINE

| | | | | |
|---|---|---|---|---|
| 254 | | LA | R6,DELETED | /*FLAG FOR TEST AND SETTING */ |
| 255 | DLET03 | LR | R7,R6 | /*COPY DELETE FLAG */ |
| 256 | | NR | R7,R8 | /*TEST FOR DELETED ALREADY */ |
| 257 | | BNZ | DLETERRX | /*IF DELETED EXIT, ELSE */ |
| 258 | | LR | R7,R8 | /*CURRENT COUNT AND FLAG */ |
| | | | | /*VALUE */ |
| 259 | | OR | R7,R6 | /*SET DELETE FLAG ON IN NEW */ |
| 260 | | CS | R8,R7,ELEMCTFL | /*ATOMIC CHANGE TO DELETE */ |
| | | | | /*FLG */ |
| 261 | | BNZ | DLET03 | /*LOOP IF OLD VALUE CHANGED */ |

*/*ELEMENT MARKED DELETED - CHAIN FOR RELEASE PROCESS BY  */
*/*SOME PROCESS  */

| | | | | |
|---|---|---|---|---|
| 262 | | L | R8,DELTANCH | /*CURRENT VALUE OF PENDING */ |
| | | | | /*DELETES */ |
| 263 | DLET04 | ST | R8,ELEMACHN | /*LIFO QUEUE ON DELETE LIST */ |
| 264 | | CS | R8,R9,DELTANCH | /*ADD TO DELTANCH */ |
| 265 | | BNZ | DLET04 | /*LOOP TILL SUCCESS */ |

*/*ELEMENT HAS BEEN DELETED (NOT FREED) - RETURN=SUCCESS  */

| | | | |
|---|---|---|---|
| 266 | | CALL RELEASE | /*RESET SHARED LATCH */ |

*/*DO RESTORE AND RETURN PROCEDURE  */

*/*ELEMENT TO DELETE NOT FOUND ON CHAIN - RETURN=NOSUCCES  */

| | | | |
|---|---|---|---|
| 267 | DLETERRX CALL RELEASE | | /*RESET SHARED LATCH */ |

*/*DO RESTORE AND RETURN PROCEDURE  */
*/*DROP R9 AS BASE REGISTER  */

TABLE IX
RELEASE LOGIC ROUTINE: OUTER LOOP CONTROL

*/*RELEASE SHARED LATCH, AND FREE PENDING DELETES IF LAST  */
*/*USER.  */
*/*REGISTERS ARE NOT SAVED - REGISTERS R0-R3 AND R14 ARE  */
*/*DESTROYED.  */
*/*ACTUAL FREEING OF REMOVED ELEMENTS IS NOT SHOWN.  */

| | | | | |
|---|---|---|---|---|
| 300 | RELEASE | SLR | R4,R4 | /*ZERO REMAINING WORK FIC */ |
| 301 | | SLR | R5,R5 | /*ZERO REMAINING WORK LIC */ |

*/*OUTER RELEASE LOOP - DETERMINES WHETHER TO WORK OR EXIT  */

| | | | | |
|---|---|---|---|---|
| 302 | RLSE00 | LM | R0,R1,SHRLATCH | /*COUNT AND CHAIN ANCHOR */ |
| 303 | RLSE01L | LR | R2,R0 | /*REPLICATE READER COUNT */ |
| 304 | | LTR | R3,R5 | /*REMAINING WORK LIC */ |
| 305 | | BZ | RLSE01A | /*IF REMAINING WORK THEN */ |
| 306 | | ST | R1,ELEMACHN-ELEMENT(,R4) | /*ADD ANY NEW TO */ |
| | | | | /*FRONT (LIFO) */ |
| 307 | | B | RLSE01B | |
| 308 | RLSE01A | LTR | R3,R1 | /*ELSE REPLICATE NEW WORK */ |
| | | | | /*LIC */ |
| 309 | | BZ | RLSE01C | /*IF NEW WORK OR REMAINING */ |
| | | | | /*WORK THEN */ |
| 310 | RLSE01B | BCT | R2,RLSE01D | /*DECREMENT-BRANCH IF NOT */ |
| | | | | /*TO 0 */ |
| 311 | | LR | R3,R2 | /*WAS ZERO-ZERO NEW ANCHOR */ |
| 312 | | LR | R2,R0 | /*RESTORE READER COUNT TO 1 */ |
| 313 | | B | RLSE01D | /*TO CDS */ |
| 314 | RLSE01C | BCTR | R2,0 | /*ELSE RELEASE SHARED LATCH */ |
| 315 | RLSE01D | CDS | R0,R2,SHRLATCH | /*ATTEMPT THE CHANGE */ |
| 316 | | BNZ | RLSE01L | /*LOOP IF NOT SUCCESS */ |

*/*IF LATCH COUNT WAS DECREMENTED, RELEASE IS COMPLETE.  */
*/*OTHERWISE, THERE IS SOME WORK REMAINING.  */

| | | | | |
|---|---|---|---|---|
| 317 | | CR | R0,R2 | /*DID I CHANGE COUNT? */ |
| 318 | | BNZR | R14 | /*IF YES, THEN EXIT-DONE */ |

*/*CHAIN TO PROCESS EITHER IN R4 OR IN R1 IF R4 IS ZERO  */

| | | | | |
|---|---|---|---|---|
| 319 | | LTR | R9,R5 | /*CHECK FOR RESIDUAL CHAIN */ |
| 320 | | BNZ | RLSE02 | /*IF RESIDUAL IS ZERO THEN */ |
| 321 | | LR | R9,R1 | /*MOVE NEW CHAIN ANCHOR */ |
| 322 | RLSE02 | SLR | R4,R4 | /*ZERO RESIDUAL LIC */ |
| 323 | | LR | R5,R4 | /*AND RESIDUAL FIC */ |

TABLE IX-continued
RELEASE LOGIC ROUTINE: OUTER LOOP CONTROL

| 324 | | USING ELEMENT,R9 | /*SET AS BASE | */ |

TABLE X
RELEASE LOGIC ROUTINE: INNER LOOP CONTROL

| 330 | RLSE03 | TM | ELEMUSFL,OFFCHAIN | /*IF ELEMENT OFF PRIMARY /*CHAIN | */ */ |
| --- | --- | --- | --- | --- | --- |
| 331 | | BNZ | RLSE04 | /*THEN TO FREE CHAIN, ELSE | */ |
| | */*ELEMENT TO BE UNCHAINED FROM PRIMARY CHAIN | | | | */ |
| 332 | | L | R8,ELEMPCHN | /*GET - NEXT ELEMENT | */ |
| 333 | | LR | R7,R9 | /*MAKE CURR COMPARE VALUE /*FOR CS | */ */ |
| 334 | | CS | R7,R8,LISTANCH | /*ATTEMPT SWAP UPDATE | */ |
| 335 | | BZ | RLSE03T | /*IF SUCCESS EXIT, ELSE | */ |
| 336 | | B | RLSE03E | /*BRANCH TO WHILE LOOP /*TEST | */ */ |
| 337 | RLSE03L | L | R7,ELEMPCHN-ELEMENT(,R7) /*TO NEXT LIST /*ELEMENT | | */ */ |
| 338 | RLSE03E | C | R9,ELEMPCHN-ELEMENT(,R7) /*POINT TO ELEMENT /*TO DELETE? | | */ */ |
| 339 | | BNE | RLSE03L | /*NO - LOOP | */ |
| 340 | | ST | R8,ELEMPCHN-ELEMENT(,R7) /*CHAIN PREV AROUND /*DELETED ONE | | */ */ |
| 341 | RLSE03T | L | R8,ELEMCTFL | /*CURRENT VALUE OF COUNT /*AND FLAGS | */ */ |
| 342 | RLSE03U | LA | R7,OFFCHAIN | /*FLAG-OFF PRIMARY CHAIN | */ |
| 343 | | OR | R7,R8 | /*SET FLAG ON IN PROPOSED /*VALUE | */ */ |
| 344 | | CS | R8,R7,ELEMCTFL | /*ATTEMPT UPDATE | */ |
| 345 | | BNZ | RLSE03U | /*LOOP TILL SUCCESS | */ |
| 346 | | L | R8,ELEMACHN | /*SAVE NEXT IN CHAIN | */ |
| 347 | | LTR | R4,R4 | /*CHECK FOR FIRST TIME | */ |
| 348 | | BNZ | RLSE03X | /*IF FIRST (ZERO) THEN | */ |
| 349 | | LR | R4,R9 | /*SAVE FIC RESIDUAL | */ |
| 350 | RLSE03X | ST | R5,ELEMACHN | /*ADD POINTER TO NEW /*ELEMENT | */ */ |
| 351 | | LR | R5,R9 | /*MAKE IT NEW LAST | */ |
| 352 | | B | RLSE05 | /*TO COMMON | */ |
| | */*ELEMENT OFF PRIMARY CHAIN - MAY NOW BE FREED | | | | */ |
| 353 | RLSE04 | L | R8,ELEMACHN | /*SAVE NEXT IN CHAIN | */ |
| | */*FREEING PROCESS OF R9 - ELEMENT NOT SHOWN, BUT DONE */*HERE WITHOUT DISTURBING R8, R4, R5, OR R14 CURRENT */*CONTENTS | | | | */ */ */ |
| 354 | RLSE05 | LTR | R9,R8 | /*POSSIBLE NEXT TO PROCESS | */ |
| 355 | | BNZ | RLSE03 | /*IF NOT ZERO, INNER LOOP | */ |
| 356 | | B | RLSE00 | /*ELSE TO OUTER LOOP | */ |
| 357 | | DROP | R9 | /*RELEASE ELEMENT BASE | */ |

In the scan logic, RCOUNT 63 is incremented by a calling process through use of the CS operation in steps 210–214. Then the process obtains the list anchor in step 215, and follows steps 216 and 217 to a SCAN02 loop beginning at step 219.

The initial pass through the SCAN02 loop goes to step 222 and branches back to step 218 each time a list element is investigated and found not to be the element being searched for. In the SCAN02 loop, R9 holds the pointer to the current element in the chain, while R6 holds the multibit identification code of the sought element. If the sought element is found by matching the code in its ID field with the code held by the calling process, the process falls through the SCAN02 loop to step 223. In the event that the end of the list is reached without finding the searched-for element, the scan loop branches at step 220 to step 223.

In step 223, the pointer to the identified element or the null value is placed in the storage location pointed to by the contents of R5 (step 224). Then, if the null pointer (stored in the primary chain field of the last element of the list 52) is detected, the scan routine is exited by a branch from step 226 to step 239, a return code is set to NOSUCCES state and the RELEASE LOGIC routine is called.

On the other hand, if the sought element is found, its address (in R9) will not be null, and the branch condition of step 226 will not be satisfied.

Refer now to FIG. 7 and steps 227–231 for an understanding of the effect on a list element of being identified by a scanning process. In FIG. 7, the first three list elements 69, 70, and 72 of the list 52 are illustrated. Assuming that the identification code of the element 70 corresponds to the identification code possessed by a currently-scanning process, the process tests whether the list element 70 has been deleted by obtaining in step 227 the USCT and USFL fields (together comprising the element data field ELEMCTFL). Then, in steps 228-230 the one-byte USFL field is tested for the DELETED flag. If the flag is set, a branch is taken at step 230 to step 239 and the element is treated from here as having not been found. On the other hand, if the USFL byte is equal to a binary zero (B:00000000) the USCT field is incremented by one in steps 231-234, using the CS atomic operation in step 233. The successful incrementation of the USCT field of list element 70 is illustrated in FIG. 7 by the hexadecimal representation of the three-byte USCT field, that is, X:00 00 01, with the 1 resulting from the USECTR1 code in step 231. After incrementing the USCT field of the list element, the scanning process drops to step 249, setting the SUCCESS return code flag, calling the release logic routine, and performing a restore and return procedure.

Refer now to FIG. 8 and to Table VIII for an understanding of the delete logic routine. In the discussion of the delete logic routine which follows, it is assumed that list element 70 is to be marked for deletion by a process calling the delete logic 58 after the list element 70 has been located by a scanning process as summarized in FIG. 7 and discussed above.

The delete logic 58, implemented by the routine of Table VIII, executes against RCOUNT 64, incrementing it by one each time a process accesses the list to delete an element therefrom. An element is deleted from the list 52 by scanning the list as described above until the element to be deleted is found. The element is deleted by setting the DELETED flag in the element's USFL field and then adding the deleted element to the delete list by means of its ACHN field.

Upon first entering the delete logic routine, a process will perform an initializing procedure and then increment RCOUNT in steps 240-244 using the CS operation. When the reader's count is incremented, the process begins searching for an element having an ID field code corresponding to the code stored in R6. In preparing to scan for the element to be deleted, the pointer in LISTANCH is first entered into R9 and then a deletion scan loop (DLET02L) extending from steps 248-252 is entered at step 249. In DLET02L, the pointer to the element currently being inspected is stored in R9. If the end of the primary chain is reached without finding the sought-for element, the delete scan routine is exited by a branch from step 250 to step 267 where the release logic routine is called after setting the return code flag to NOSUCCES.

If the element is found, the element's USCT and USFL fields are obtained in step 253 and the DELETED flag is entered into the USFL field in steps 254-261. In the process of setting the DELETED flag in the USFL field of an element, a process will first test to see whether the flag has previously been set, with the test performed in steps 254-257. In the event that the flag has previously been set, a branch is taken in step 257 to step 267 where the release logic routine is called following setting of the return code flag to NOSUCCES.

Assuming that the found element's DELETED flag has not been set, the routine will drop from step 257 and set the flag in steps 258-261 by means of the CS atomic operation of step 260. It should be noted that the CS operation in step 260 together with the branch in step 261 back to step 255 permits multiple process access to the delete logic routine by permitting more than one process to locate an element but limiting the setting of its DELETED flag to the first process locating the element. It should further be noted that the CS atomic operation of step 260 permits only the process that sets the DELETED flag of a found element to chain the element to the delete list by means of steps 262-265, with the element being added as the list header by placing its address in DELTANCH by the CS atomic operation of step 264. Of course, in adding the element at the head of the delete list, the pointer formerly held in DELTANCH is placed in the ACHN field of the list element being added to the delete list.

FIG. 8 illustrates the outcome of delete logic processing on the list element 70. Once the list element 70 has been identified, the deleting process sets the USFL field DELETED flag represented in binary as B:00000001. In addition, the element 70 has been added at the head of a delete list through its ACHN field and by placing a pointer to the element in DELTANCH 66. The element 70, however, remains linked to the list 52 through its PCHN field.

As illustrated in FIG. 6, and described above with reference to the scan and delete logic routines, each process after scanning or deleting from the list 52 exits the list maintenance logic 50 only by calling release logic 60. Each process entering the release logic routine (Tables IX and X) will decrement the RCOUNT contents by one. If the RCOUNT contents are now zero, the process cannot exit the release logic and the list maintenance logics until it discharges the obligation of removing delete list elements from the primary chain and releasing the delete list elements.

A process calling the release routine determines whether obligations have been passed to it by inspection of DELTANCH 66. If there is a null in DELTANCH 66, there are no pending obligations and the process is permitted to exit the logics 60 and 50. On the other hand, if there is a pointer in DELTANCH 66, the process must perform the actions of removing delete list elements from the primary chain and freeing removed elements. The process that reduces RCOUNT 64 to zero and begins to perform passed obligations must continue to perform those obligations until either there is no work remaining to be done, or until that process is no longer alone in accessing the list 52. This latter condition is satisfied when another process accesses the list and increases the RCOUNT 64 contents to a non-zero positive value.

The RELEASE LOGIC processing is split between outer loop processing that is embodied in the code listing of Table IX and inner loop processing illustrated in Table X. In the descriptions of the outer and inner loop release processing routines, the doubleword comprising RCOUNT 64 and DELTANCH 66 is referred to as a shared latch (SHRLATCH listed in Table V).

Outer loop release logic processing is initialized by zeroing the contents of the general registers dedicated to the calling processor and designated as R4 and R5. R4 is used in the inner loop processing to store a first in chain (FIC) pointer while R5 contains a last-in-chain (LIC) pointer. Initially, with R5 zeroed, the process calling the release logic will read and store SHRLATCH in steps 302-305 and branch from step 305 to step 308. In step 308 the DELTANCH contents are copied from R1 to R3 and tested. If the contents are zero, indicating that the delete list is empty and therefore that no obligations have been passed by prior processes, the current process in the release logic 60 is permitted to exit from the release logic and the list maintenance logic by branching to step 314. In step 314 the RCOUNT contents that were copied into R2 in step 303 are decremented by one and placed back into R2. The exiting process executes atomically against the RSV by placing the decremented reader's count back in the RCOUNT 64, using the CDS atomic operation in step 315. Step 316 provides for a branch back to evaluate RCOUNT 64 and DELTANCH 66 in case the CDS operation of step 315 fails. Of course, the operation would fail if a process either gained access to the list 52 through the scan or delete logics 56 or 58 (in which case RCOUNT 64 would increase) or if a process executed the delete logic routine and made an entry into DELTANCH 66 pointing to a delete list element before the CDS operation was begun.

Assuming, however, that the CDS operation of step 315 succeeds, a process compares the old reader's count in R0 and the reader's count in R2. If the values are different, the value in R2 (which is the current value in RCOUNT 64 as a result of step 315) represents the effect of the process in changing the reader's count and permits it to exit the outer loop release control of Table IX by way of step 318.

Returning to step 308, if there is a pointer in DELTANCH 66, indicating population of the delete list and the requirement of a process to perform passed obligations, no branch will be taken from step 309. In this case, the reader's count copied into R2 in step 303 is decremented by one in step 310. If step 310 does not reduce the contents of R2 to zero, other processes are concurrently accessing the list 52 and the process currently executing the release logic routine is freed from the obligations represented by the presence of elements in the delete list. In this case, the decremented value of the reader's count that represents the exit of the current process from the list maintenance logic is performed by the atomic instruction in step 315, with a provision for looping again to inspect the SHRLATCH if the CDS instruction fails. Assuming the instruction is successful, the process will drop through step 316, detect in step 317 that it changed the reader's count, and exit the release logic and list maintenance logic in step 318.

Returning to step 310, if the contents of R2 are reduced to zero by the BCT operation, the decrementing process is alone in the list 52 and must execute the passed obligations represented by the delete list. However, while it is performing the first step of processing delete list elements by removing them from the primary chain, the obligation-receiving process must restore the readers's count to one and detach the delete list from DELTANCH 66 so that its processing of the current delete list will not be affected by later processes adding other deleted elements to the list. These results are accomplished in steps 311 through 316 by means of the atomic CDS operation of step 315. Assuming success in the CDS operation of step 315, the contents of R0 and R2 will be equivalent, DELTANCH will contain 0, the pointer formerly in DELTANCH will reside in R1, and the executing process will fall through step 318 to step 319.

At step 319 during the first pass through the outer loop control, the pointer formerly held in DELTANCH is in R1 by virtue of the operation of step 302. In preparation for receiving this pointer in R9, which is designated as the base anchor for the inner loop processing of Table X, the contents of R9 are zeroed in step 319, no branch is taken from step 320 because R5 was cleared in step 301, and the pointer is moved to R9 in step 321. Steps 322-324 clear the contents of R4 and R5 and designate the contents of R9 as the base for release logic inner loop processing that is embodied in Table X.

Referring now to FIG. 9, the result of release logic outer loop processing can be understood. In considering FIG. 9, it will be assumed that element 70, deleted as described above, is the list header of the delete list. At the point where a process executing the routine of Table IX is determined to be alone in accessing the list 52 at the same time that there are obligations to complete delete processing of previously-deleted elements, the primary chain still includes the PCHN fields of those deleted elements, including the PCHN field of the element 70. However, RCOUNT 64 has been reduced to one, the pointer to the head of the delete list has been moved from DELTANCH 66 to R9 and a zero has been placed in DELTANCH.

Release logic inner loop processing, illustrated in Table X, includes two distinct phases: removal of elements marked for deletion from the primary chain and then freeing those elements. The first phase is performed for all of the elements in the list now anchored by R9 in step 324 of Table IX. Following removal of these elements from the primary chain, the executing process will return to Table IX outer loop processing to determine whether another process has gained access to the list 52. If another process has called either of the logics 56 and 58 and, as a result, incremented RCOUNT 64, the process transitioning between the inner loop control phases will detect the presence of the other process. When the presence of another process is detected during the transition between inner loop phases, the chain of elements that have been deleted and removed from the primary list will be added back into the current delete list for being finally freed at a later time by another process. Thus, it is possible for the delete list to comprise elements which have been deleted but not removed from the primary chain, as well as elements which have been both deleted and removed from the primary chain but not freed.

As a further aid in understanding the release logic inner loop processing, the list detached from DELTANCH 66 and anchored by R9 in steps 319-324 of Table IX is referred to in the discussion which follows as the "alternate list" to distinguish it from a delete list which may be built from DELTANCH 66 while the release logic routine of Tables IX and X is being performed.

The inner loop control executes first phase processing of the alternate list by inspecting each element of the alternate list in succession and taking steps to remove from the primary chain those elements that have not yet been completely deleted from the list 52. This release processing will be performed iteratively until all elements in the alternate list have been removed from the primary chain. Thus, in step 330, the USFL field of an element is inspected to determine whether it contains a set OFFCHAIN flag. As illustrated in FIG. 10, the OFFCHAIN flag is the second least significant bit in the USFL field of list element 70. If the OFFCHAIN flag is not set, the element has not yet been removed from the primary chain and the inner loop routine falls through step 331 to step 332. The removal is accomplished by steps 332-340 by moving the pointer in the PCHN field of the element to be removed into the PCHN field of the element immediately preceding the to-be-removed element in the primary chain. This is illustrated in FIG. 10 where the pointer in the PCHN field of the to-be-deleted element 70 also resides in the PCHN field of the list element 69 which immediately preceded the element 70 in the primary chain. The identical pointers in the PCHN fields of list elements 69 and 70 point to list element 72 which formerly was the immediate successor of list element 70.

In order to provide for the instance where the element to be deleted is the listhead of the primary chain, steps 332-336 provide for placing the pointer in the PCHN field of the element to be deleted into LISTANCH 63 by means of the atomic CS operation in step 334. If the operation is successful, a branch will be taken in step 335 to step 341. If not successful, indicating that the element to be deleted is not the listhead, the removal procedure described above is accomplished in steps 337-340.

FIG. 10 illustrates that removal of a list element (list element 70, for example) from the primary chain does not result in alteration of the PCHN field of the element removed. This preserves the integrity of the list 52 in that a process examining the list element 70 as a result of scan or delete logic processing at the moment the primary chain is reconfigured to bypass the element will be directed back into the primary chain by the pointer to list element 72 in the PCHN field of the deleted element.

Once an element has been removed from the primary chain, the release logic inner loop processing sets the OFFCHAIN flag of the element by way of the routine segment involving steps 341-345. In this segment, the CS atomic operation is used in step 344 to set the OFFCHAIN flag of an element.

Once an element has been deleted and removed from the primary chain, the inner loop routine reverses the directional sense of the element in the alternate list by execution of steps 346-352. In this regard, refer to FIG. 10 where it is assumed that list element 70 was the list header of the delete list detached in the outer loop processing described above. As the header, its ACHN field would initially contain a pointer indicating the second element 74 in the alternate list. In reversing the directional sense of the alternate list, list element 70 is changed to anchor the alternate list and the pointing direction of the alternate list is reversed to be directed toward the list element 70. To accomplish this, a zero is placed in the ACHN field of the list element 70 and a pointer to list element 70 is moved into the ACHN field of the list element 74, which list element 70 previously pointed to. Thus, it should be clear that in steps 346-352, as each element of the alternate list is released from the primary chain, the pointer of its ACHN field is reversed to point to the alternate list element that previously preceded it. The result of the reversal of directional sense of the alternate list is represented by reversal of the ACHN field arrows of list element 70 from FIG. 9 to FIG. 10.

In addition to reversing the directional sense of the alternate list, the first phase of inner loop processing anchors the alternate list between registers R5 and R4, with R5 containing the LIC pointer to the last element placed into the alternate chain and the register R4 containing an FIC pointer to the element first placed in the alternate list.

Once an alternate list element's pointer has been reversed in steps 346-352, the inner loop of the release logic branches to step 354 to move the pointer to the next element in the alternate list to be released from the primary chain from register R8 to register R9. If the pointer is zero, the end of the alternate list has been reached, and the inner loop control branches, in step 356, back to the outer loop control at step 302.

When a process executing the inner loop of the release logic branches to the outer loop at step 302, it will inspect both the RCOUNT 64 and the DELTANCH 66 to determine first whether it is still the only or last process having access to the list 52 and whether any more obligations have been passed in the form of delete list elements anchored by the DELTANCH 66 while it was performing the inner loop processing. To accomplish this, a process reentering the outer loop processing at step 302 obtains the contents of the SHRLATCH in step 302, copies the current reader's count from register R0 to R2 (step 303) and the LIC pointer to register R3 (step 304). With a populated alternate list still existing, no branch will be taken from step 305 and the pointer to the current delete listhead will be stored in the ACHN field of the alternate list anchor in step 306. A branch follows to step 310 where the contents of RCOUNT is tested.

In steps 310-316, if the currently-executing process determines that it is alone (RCOUNT =1) it will progress as related above to the release logic inner loop processing, while zeroing the DELTANCH 66. If, on the other hand, one or more processes are accessing the list 52 through the scan or delete logics 56 or 58, the reader's count will be deleted by one and the LIC pointer will be placed in DELTANCH 66 by the CDS operation of 315. After this the process will exit the release and list maintenance logics through step 318.

In the case where a process reenters the release logic inner loop routine, it may be required to process an alternate list compounded of list elements that have not yet been removed from the primary chain and elements that have been deleted and removed from the primary chain but not yet released. In this case, the list elements that have not yet been removed from the primary chain will be processed for removal from the primary chain as described above. On the other hand, elements that have been removed from the primary chain but not yet released by the list maintenance logic 50 will have their OFFCHAIN flags set and each will cause a branch to be taken at step 331 to step 353.

At step 353, the pointer in the ACHN field of an element having a set OFFCHAIN flag will be copied to register R8 and then the list element will be freed. Although not described with reference to the specific list maintenance procedure described herein, releasing a deleted element with a set OFFCHAIN flag can entail releasing the element to general storage or any other installation-dependent procedure. Once the element has been freed, step 354 moves the pointer to the next element in the alternate list to register R9. Step 355 tests for a zero value, designating the end of the alternate list. If the list end has not been reached, a branch will be taken back to step 330, otherwise step 356 will return the executing process to the release logic outer control routine at step 302 in Table IX.

Although specific machine-readable code listings embodying procedures useful for performing both embodiments of the method of the invention have been listed and described hereinabove, it will be recognized by the skilled artisan that either embodiment of the method of the invention may be practiced other than as specifically set out herein without departing from the spirit or the scope of the invention.

We claim:

1. A lock-free method for serializing access to a shared resource among concurrent processes in either a multiprogramming pre-emptive scheduling environment or where at least two processors share a common main store, wherein process access to resources includes the indivisible step of reading a resource status variable, storing its value in a save area, and, conditioned on the value of the variable, altering said variable, comprising the steps of:

storing each resource status variable in a main store location;

and the further indivisible steps of:

partially executing against a resource status variable at said main store location by one process while checking for resource contention from another process; and in the event of resource contention between processes, passing an obligation to complete the execution against the resource status variable at said main store location to one of said contending processes.

2. The method of claim 1 wherein said obligation is passed to the first of said contending processes to partially execute against said resource status variable.

3. The method of claim 1 wherein said obligation is passed to the last of said contending processes to partially execute against said resource status variable.

4. The method of claim 1 wherein each resource status variable includes three words, only two of which need be contiguously stored.

5. The method of claim 1 wherein each resource status variable includes three words, two of which are contiguously stored.

6. A method for providing two or more contending processes with concurrent access to a shared resource wherein resource access includes an obligation to perform an access completion operation, comprising the steps of:

storing a single resource status variable indicating the availability of a shared resource;

performing, for each process requiring access to said resource, an initiation operation including changing the condition of said resource status variable to indicate access of said process to said resource; and in the event of concurrent access by two or more processes to said resource, passing, to one of said processes, the obligation to perform said access completion operation including changing the condition of said resource status variable to indicate that no process has access to said resource.

7. The method of claim 6 wherein said obligation is passed to the first of said two or more processes performing said initiation operation.

8. The method of claim 6 wherein said obligation is passed to the last of said two or more processes performing said initiation operation.

9. The method of claim 6 wherein said resource status variable includes three words, only two of which need be contiguously stored.

10. The method of claim 6 wherein said resource status variable includes at least three words, two of which are contiguously stored.

11. The method of claim 7 wherein said shared resource includes a communication channel.

12. The method of claim 8 wherein said shared resource includes a linked data list.

13. In a processing system including a storage facility, plural concurrently-executing processes, at least one shared resource, and operating system means for managing the use of said shared resource by said processes, the improvement comprising a resource allocation system in said operating system for permitting concurrent, non-exclusive use of said shared resource by said processes, said resource allocation system comprising:

an undivided resource status data object stored in said storage facility for indicating use of the shared resource by one or more of said processes;

atomic operation means for, each time a process uses said resource, indivisibly reading said resource status data object, storing the value of said resource status data object in a save area of said processing system, and, based upon the value of said resource status data object, altering said variable to indicate said use; and logic means executable by said processes for enabling a process to, by means of said atomic operation means, partially execute against said resource status data object while checking for contention for the resource from another process and for, in the event of resource contention between said partially executing process and another process, passing an obligation to complete execution against said resource status data object to one of said competing processes.

14. The improvement of claim 13 wherein said obligation is passed to the first of said contending processes to partially execute against said resource status variable.

15. The improvement of claim 13 wherein said obligation is passed to the last of said contending processes to partially execute against said resource status variable.

16. The improvement of claim 13 wherein said resource status data object includes three words, only two of which need be contiguously stored.

17. The improvement of claim 13 wherein said resource status data object includes three words, two of which are contiguously stored.

18. The improvement of claim 13 wherein said shared resource includes a communication channel.

19. The improvement of claim 13 wherein said shared resource includes a linked list of data objects.

* * * * *